United States Patent
Nakayama et al.

(10) Patent No.: US 7,408,000 B2
(45) Date of Patent: Aug. 5, 2008

(54) DISPERSANT OR COATABILITY IMPROVER

(75) Inventors: Hiromitsu Nakayama, Kyoto (JP); Makoto Katsukawa, Kyoto (JP); Hirofumi Inoue, Kyoto (JP); Takayuki Nagai, Toyota (JP); Keisuke Ohnishi, Toyota (JP)

(73) Assignees: Sanyo Chemical Industries, Ltd., Kyoto (JP); Toyota Jidosha Kabushiki Kaisha, Aichi-ken (JP)

( * ) Notice: Subject to any disclaimer, the term of this patent is extended or adjusted under 35 U.S.C. 154(b) by 397 days.

(21) Appl. No.: 11/089,549

(22) Filed: Mar. 25, 2005

(65) Prior Publication Data

US 2005/0250907 A1    Nov. 10, 2005

(30) Foreign Application Priority Data

Mar. 26, 2004    (JP) .............................. 2004-092097

(51) Int. Cl.
    *C08K 3/34*    (2006.01)
(52) U.S. Cl. ...................... 524/445; 524/522; 524/523; 524/528; 524/576
(58) Field of Classification Search ................. 524/445, 524/522, 523, 528, 576
    See application file for complete search history.

(56) References Cited

U.S. PATENT DOCUMENTS 5,654,369 A * 8/1997 Tsubaki et al. .............. 525/205

6,384,121 B1   5/2002 Barbee et al.

FOREIGN PATENT DOCUMENTS

| EP | 0 755 983 A2 | 1/1997 |
| EP | 1 584 653 A1 | 10/2005 |
| JP | 09-048891 | 2/1997 |
| JP | 10-182892 | 7/1998 |
| JP | 2000-239397 | 9/2000 |
| JP | 2004-250702 A | 9/2004 |
| WO | WO 01/85831 | 11/2001 |

OTHER PUBLICATIONS

Lin, Jiang-Jen et al. "Copolymer-Layered Silicate Hybrid Surfactants from the Intercalation of Montmorillonite with Amphiphilic Copolymers", Langmuir 19, 2003, pp. 5184-5187, XP-002403809.

European Search Report dated Oct. 24, 2006 issued in corresponding European Application No. EP 05 00 6620.

* cited by examiner

*Primary Examiner*—Peter D Mulcahy
(74) *Attorney, Agent, or Firm*—Westerman, Hattori, Daniels & Adrian, LLP.

(57) ABSTRACT

The present invention provides a modifier for resins which comprises a dispersant (I) or a coatability improver (II) comprising a modified polyolefin (A) and a filler in combination, the modified polyolefin (A) containing a hydrophobic group comprising a polyolefin (a) having a number average molecular weight of 1,500 to 100,000 and 0.2 to 10 double bonds per 1,000 carbons at the molecular terminus and/or within the molecule, and a hydrophilic group containing at least one onium base (b), and a number average molecular weight per (b) being 750 to 50,000.

13 Claims, No Drawings

DISPERSANT OR COATABILITY IMPROVER

TECHNICAL FIELD

The present invention relates to a dispersant or a coatability improver. More particularly, the present invention relates to a dispersant useful for dispersing fillers, particularly clay, in resins such as polyolefin, or a coatability improver for improving adhesiveness of a coat film to resins such as polyolefin.

BACKGROUND ART

Conventionally, a maleic acid-modified polypropylene oligomer, etc. have been used as a dispersant in dispersing fillers for improving the mechanical and thermal characteristics (for example, tensile strength, flexural strength, wear resistance and thermal deformation temperature) of polyolefin resins. In particular, although those in which clay having hydrophilic alkyl ammonium chloride, etc. being inserted between layers are finely dispersed in polyolefins become improved in the mechanical and thermal characteristics of resins even if clay is used in a small amount, a maleic acid-modified polypropylene oligomer has also been used as a dispersant (for example, refer to Japanese Kokai Publication Hei-10-182892). In the description below, when clay is used as a filler, the operation comprising inserting an organic cation between clay layers to increase the space between layers by substituting Na ion, etc. occurring between layers, and further surrounding the circumference of clay with an organic matter to facilitate the dispersion of clay in resins as described above is defined as "organification", the one used for the organification is defined as an "organification dispersant". These terms are used in the same meaning hereinlater.

Furthermore, as a resin modifier for improving the coatability (coat film adhesiveness, etc.) of polyolefin resins, there has been known a hydroxy-modified polypropylene containing a hydroxyl group (for example, refer to Japanese Kokai Publication Hei-09-48891).

SUMMARY OF THE INVENTION

However, with only a small amount of addition of a maleic acid-modified polypropylene oligomer, the dispersion effect of a filler is also small, and when the addition amount is increased to raise the filler dispersion effect, since said oligomer itself is low in the molecular weight, the mechanical and thermal characteristics of the resins conversely tend to decrease. Moreover, when the molecular weight of the maleic acid-modified polypropylene oligomer is increased, since the maleic acid-modified polypropylene oligomer has principally negative relation between the molecular weight and maleic acid modification rate, there is a problem that the maleic acid-modified polypropylene oligomer having high molecular weight is low in the modification rate and the dispersion effect itself becomes insufficient, etc. Furthermore, when organized fillers (e.g. clay) are dispersed in polyolefins, there is also a problem that the prior filler organification process before dispersing in polyolefins is complicated and the maleic acid-modified polypropylene oligomer is low in the dispersion effect thereof.

Moreover, when the above hydroxyl-modified polypropylene containing a hydroxyl group is used as a resin modifier for improving the coatability, it is necessary to increase the modification level of the hydroxyl-modified polypropylene for securing sufficient coat film adhesiveness, etc. As a result, the molecular weight of the hydroxy-modified polypropylene decreases and the mechanical characteristics (particularly impact resistance) become deteriorated. On the other hand, when the modification level is decreased, there arises a problem that sufficient coat film adhesiveness cannot be obtained, etc.

The present invention has for its object, as regarding the dispersant, to provide a dispersant excellent in filler dispersion effect in resins with a small amount of addition without decreasing the mechanical and thermal characteristics of the resins. Another object is to provide a dispersant which can omit the prior complicated filler organification process before dispersing in reins, and also is high in filler dispersion effect. Further object is to provide a modifier containing said dispersant and a filler, a composition for resin modification which comprises containing an additive in said modifier, and a master batch resin composition which comprises said modifier or composition for resin modification and a polyolefin resin.

Furthermore, as regarding the coatability improver, the present invention has for its object to provide a coatability improver for improving the coatability (coat film adhesiveness, etc.) of resins with a small amount of addition without decreasing the mechanical characteristics of the resins, a modifier which comprises said coatability improver and a filler, a composition for resin modification which comprises containing an additive in said modifier, and a master batch resin composition which comprises said modifier or composition for resin modification and a polyolefin resin.

DETAILED DESCRIPTION OF THE INVENTION

The present inventors have made intensive investigations to solve the above-mentioned subjects, and as a result, they finally achieved the present invention.

That is, the present invention relates to a modifier for resins which comprises a dispersant (I) or a coatability improver (II) comprising a modified polyolefin (A) containing a hydrophobic group comprising a polyolefin (a) having a number average molecular weight of 1,500 to 100,000 and 0.2 to 10 double bonds per 1,000 carbons at the molecular terminus and/or within the molecule, and a hydrophilic group containing at least one onium base (b), and a number average molecular weight per (b) being 750 to 50,000, and a filler-in combination;

a composition for resin modification which contains said modifier, and further one or two or more additive (B) selected from the group consisting of a colorant, reinforcing agent, flatting agent, flame retardant, antistatic agent, other coatability improver, other dispersant, antioxidant and ultraviolet absorber;

a master batch resin composition which comprises said modifier or composition for resin modification and a polyolefin resin (C), and the content of the modifier being 10 to 80% by weight;

a method for improving mechanical and thermal characteristics of a polyolefin plastic product which comprises introducing the dispersant (I) comprising said (A) into a polyolefin resin; and a method for improving the coatability of a polyolefin plastic product which comprises introducing a coatability improver (II) comprising said (A) into a polyolefin resin.

The modifier for resins comprising a dispersant (I) or a coatability improver (II) of the present invention is quite useful for exerting the following effects.

(1) Excellent in filler dispersion effect in polyolefin resins with a small amount of addition without decreasing the mechanical and thermal characteristics of the resins.
(2) Since an onium base is contained, it is possible to organize a filler, e.g. clay in advance and finely disperse the resultant in polyolefin resins, and in addition, it is also possible to finely disperse clay without carrying out organification in advance.
(3) It is possible to sufficiently exert the filling effect of fillers attributable to improvement in the mechanical and thermal characteristics of polyolefin resins (hereinafter such effect is abbreviated as resin modification effect).
(4) With a small amount of addition, the coatability of resins (coat film adhesiveness, etc.) can be improved without decreasing the mechanical characteristics of the resins.

The modified polyolefin (A) which comprises a hydrophobic group comprising a polyolefin (a) having a number average molecular weight of 1,500 to 100,000 and 0.2 to 10 double bonds per 1,000 carbons at the molecular terminus and/or within the molecule, and a hydrophilic group containing at least one onium base (b), and a number average molecular weight per (b) being 750 to 50,000, of the present invention, can be used as a dispersant (I) or coatability improver (II) for resins.

That is, the dispersant (I) according to the present invention can disperse fillers without decreasing the properties of polyolefin resins. Particularly, when clay is used as a filler, since the space between clay layers can be increased only by kneading without carrying out organification treatment of clay in advance, the dispersant is excellent in convenience in nano composite resin production, and thus is used quite widely as a dispersant for organic and inorganic fillers, and a dispersant for polyolefin-base nano composite resin molding. Moreover, the coatability improver (II) according to the present invention can improve the coatability (coat film adhesiveness, etc.) of polyolefin resins with a small amount of addition without decreasing the mechanical characteristics of the resins.

Furthermore, since the modifier for resins combinedly composed of said dispersant (I) or a coatability improver (II) and clay can remarkably improve the mechanical and thermal characteristics only by kneading with polyolefin resins, it is quite useful as a modifier for polyolefin resins in each industrial field, particularly in building material field and automobile field.

BEST MODE FOR CARRYING OUT THE INVENTION

[Polyolefin (a)]

(a) according to the present invention is a polyolefin having a number average molecular weight [hereinafter, referred to briefly as Mn; as determined by gel permeation chromatography (GPC)] of 1,500 to 100,000 and 0.2 to 10 double bonds per 1,000 carbons at the molecular terminus and/or within the molecule, and the lower limit of the number of said double bond is preferably 0.3, more preferably 0.5, and the upper limit is preferably 6, more preferably 5. When the number of said double bond is less than 0.2, the modification of the polyolefin (a) in the post-process becomes difficult, and when it exceeds 10, a problem arises in compatibility with a polyolefin resin in the resin composition mentioned below. The amount of the double bond can be calculated from the rate of the each integration value of a peak derived from the double bond between 4.5 and 6.0 ppm and a peak derived from the saturated hydrocarbon group between 0.5 and 2.0 ppm in the spectrum obtained by $^1$H-NMR (nuclear magnetic resonance) spectrometry.

Examples of (a) include (co)polymers of one or two or more olefins as well as copolymers of one or more olefins and one or more other monomers. In the subsequent description, "%" and "ratio" mean "% by weight" and "weight ratio", respectively, unless otherwise specified.

Examples of the above olefin include alkenes containing 2 to 30 (preferably 2 to 12, more preferably 2 to 4) carbon atoms (hereinafter abbreviated as "C"), for example ethylene, propylene, 1-, 2- and iso-butene as well as C5-30 α-olefins (1-hexene, 4-methylpentene-1,1-decene, 1-dodecene, etc.); and examples of the other monomer include unsaturated monomers copolymerizable with olefins, for example styrene, vinyl acetate, (meth)acrylic acid (denoting acrylic acid and/or methacrylic acid; similar expressions are used hereinafter) and alkyl (C1-30) esters thereof.

Specific examples of (a) include ethylene-based polymers such as high-density, medium-density and low-density polyethylene species and copolymers of ethylene and a C4-30 unsaturated monomer [butene (1-butene etc.), a C5-30 α-olefin (1-hexene, 1-dodecene, etc.), vinyl acetate, (meth)acrylic acid, etc.] (copolymerization ratio: 30/70 to 99/1, preferably 50/50 to 95/5), and the like; propylene-based polymers such as polypropylene, copolymers of propylene and a C4-30 unsaturated monomer (same as above) (copolymerization ratio: same as above); ethylene/propylene copolymers (copolymerization ratio: 0.5/95.5 to 30/70, preferably 2/98 to 20/80); polymers of a C4 or higher olefin, for example polybutene and poly-4-methylpentene-1. Among these, polyethylene, ethylene/propylene copolymers, propylene/unsaturated monomers (C4-20) copolymers, and, in particular, polypropylene is preferred from the viewpoint of dispersibility of the filler mentioned below to polyolefin resins.

As for the Mn, (a) has the lower limit of 1,500, preferably 2,000, more preferably 2,500, particularly preferably 3,000; and the upper limit of 100,000, preferably 50,000, more preferably 25,000, particularly preferably 10,000. When the Mn is below 1,500, the mechanical strength of resins after dispersing the filler mentioned below becomes deteriorated, and when the Mn exceeds 100,000, the reactivity with the modifier mentioned below is decreased, and it is not preferable in view of the filler dispersion ability.

Examples of (a) include polyolefins as polymerized and degraded polyolefins [products of mechanical, thermal or chemical degradation of high-molecular-weight polyolefins (preferably having a Mn of 50,000 to 150,000)]. Preferred from the viewpoint of ease of modification and dispersion ability are degraded polyolefins, in particular thermally degraded polyolefins. The thermally degraded polyolefins are not particularly restricted but there may be mentioned those thermally degraded ones derived from high-molecular-weight polyolefins by heating in an inert gas (generally at 300 to 450° C. for 0.5 to 10 hours) (e.g. those described in Japanese Kokai Publication Hei-03-62804).

The lower limit of the thermosoftening point of (a) is preferably 30° C., more preferably 40° C., and particularly preferably 60° C. in view of uniform fusion blending with resins and prevention of surface transition in a resin molding. In view of prevention of resin deterioration, the upper limit is preferably 210° C., more preferably 180° C., and particularly preferably 150° C. The thermosoftening point referred herein represents a value measured according to JIS K 2207-96 (ring and ball thermosoftening point measurement method).

(a) is generally subjected to carboxy modification in advance when constituting a hydrophobic group of the modified polyolefin (A) of the invention, and a residue of said caboxy-modified polyolefin (ax) [residual moiety after the elimination of a carboxyl group in (ax)] constitutes a hydrophobic group. Said (ax) contains a polyolefin (ax1) obtainable by carboxy modification of (a) with α,β-unsaturated carboxylic acid (anhydride) (m1) mentioned below, etc., a polyolefin (ax2) obtainable by further modifying (ax1) with a carboxy modifier (m2) (secondary modification), and mixtures comprising two or more species of these.

Examples of (ax1) include (i) modifications of (a) as resulting from reaction with (m1) and (ii) modifications of (a) as resulting from oxidation with an oxidizing agent (e.g. oxygen and/or ozone) for carboxyl group introduction.

Examples of α,β-unsaturated carboxylic acid (anhydride) (m1) include unsaturated mono- and dicarboxylic acids, and anhydrides thereof.

The monocarboxylic acids include C3-18 (preferably C3-15, in particular C3-10) aliphatic, alicyclic and aromatic ring-containing monocarboxylic acids, for example (meth)acrylic, (iso)crotonic, cyclohexenemonocarboxylic and cinnamic acid.

The dicarboxylic acids (anhydrides) include aliphatic ones (C4-18, preferably C4-15, in particular C4-12), for example maleic acid (anhydride), fumaric acid, itaconic acid (anhydride), citraconic acid (anhydride), mesaconic acid and allylmalonic acid; alicyclic ones (C7-24, preferably C8-16), for example 4-cyclohexene-1,2-dicarboxylic acid; and aromatic ring-containing ones (C8-24, preferably C8-16), for example phenylmaleic acid. Preferred from the viewpoint of the compatibility and reactivity with (a) and of the melt viscosity of the resulting (ax1) are unsaturated dicarboxylic acid (in particular aliphatic dicarboxylic acid) anhydrides, in particular, maleic anhydride (hereinafter abbreviated as "MA").

The amount of (m1) to be used for modification is generally 0.5 to 40%, preferably 1 to 30% in view of the reactivity with (a) and dispersibility of the filler mentioned below, based on the weight of (a).

Although the modification method and conditions are not particularly restricted, (m1) can be thermally added to the double bond of (a) by the fusion technique or solution technique. For example, there may be mentioned (1) the method comprising mixing (m1) with (a) in fused state and then heating the mixture, if necessary in the presence of an organic peroxide; (2) the method comprising mixing (a), (m1) and a solvent together and then heating the mixture, if necessary in the presence of an organic peroxide; and (3) the method comprising adding an organic peroxide to (a) and (m1) during kneading thereof with heating in a twin-screw extruder.

Examples of the above organic peroxide include dicumyl peroxide, di-tert-butyl peroxide and the like. The amount thereof is generally 0.1 to 10%, preferably 0.5 to 5% in view of the addition efficiency of (m1), based on the total amount of (a) and (m1).

The reaction temperature can be varied within a wide range (e.g. 80 to 230° C.) but should be adequately selected depending on the method employed. In the case of method (1), it is generally 100 to 220° C., preferably 140 to 200° C.; in the case of method (2), it is generally 80 to 180° C., preferably 110 to 150° C.; and in the case of method (3), it is generally 80 to 140° C. Examples of the solvent to be used in method (2) include toluene and xylene. Among these methods, the method (2) is preferred from the viewpoint of the possibility of the reaction being carried out uniformly with a low level of byproduct formation. The carboxyl group introduction by oxidation can be carried out by the method described in U.S. Pat. No. 3,692,877, for instance.

Examples of the modifier (m2) to be used for producing (ax2) include (m20) precursors of (m21) mentioned below (compounds capable of forming (m21); hereinafter the same shall apply), namely a lactam and a lactone, (m21) an aminocarboxylic acid and a hydroxycarboxylic acid, (m22) combinations of a carboxy-reactive coupling agent and a polycarboxylic acid (indicating such an acid or an ester-forming derivative thereof; hereinafter the same shall apply), and combinations of two or more species of these. The secondary modification of (ax1) can be carried out by ring-opening addition (polymerization) of (m20), by (poly)condensation of (m21), or by the coupling reaction of (m22).

Examples of the aminocarboxylic acid include C2-12 ones, for example amino acids [glycine, alanine, valine, (iso)leucine, phenylalanine, etc.], ω-aminoalkanoic acids [e.g. ω-aminocaproic, ω-aminoenanthic, ω-aminocaprylic, ω-aminopelargonic, ω-aminocapric, 11-aminoundecanoic and 12-aminododecanoic acid], and aromatic aminocarboxylic acids (e.g. o-, m- and p-aminobenzoic acid); examples of the lactam include C4-15 (preferably C6-12) ones, for example caprolactam, enantholactam, laurolactam and undecanolactam; the lactone and hydroxycarboxylic acid include those corresponding to the above-mentioned lactams and aminocarboxylic acids (resulting from substitution of O for NH) (e.g. ε-caprolactone, γ-butyrolactone, γ-valerolactone, ω-hydroxycaproic acid, salicylic acid, p- and m-hydroxybenzoic acid), and glycolic acid, glyceric acid, tartronic acid, malic acid, tartaric acid and benzilic acid. Preferred are caprolactam and 12-aminododecanoic acid.

The amount of the modifier (m20) or (m21) is 1 to 10 moles or more, preferably 1 mole, per unsaturated dicarboxylic acid (anhydride) group or per carboxyl group in (ax1).

Examples of the carboxy-reactive coupling agent include compounds having two or more groups reactive with a carboxy group of polycarboxylic acid, for example polyols, organic polyisocyanates (hereinafter abbreviated as "PIs"), polyamines (hereinafter abbreviated as "PAs"), polyepoxides and epoxyalcohols. These polycarboxylic acids, polyols, PIs, PAs and polyepoxides include those mentioned later herein, and the epoxyalcohols include glycidol and the like.

(ax2) comprises a structure resulting from conversion of at least part of the carboxyl groups (carboxylic acid groups or carboxylic acid anhydride groups; hereinafter the same shall apply) of (ax1) to, for example, carboxy-containing groups represented by the following general formulas:

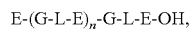

E-(G-L-E)$_n$-G-L-E-OH,

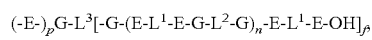

(-E-)$_p$G-L$^3$[-G-(E-L$^1$-E-G-L$^2$-G)$_n$-E-L$^1$-E-OH]$_f$

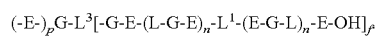

(-E-)$_p$G-L$^3$[-G-E-(L-G-E)$_n$-L$^1$-(E-G-L)$_n$-E-OH]$_f$

In the above formulas, E represents —CO— (carbonyl group); n represents an integer of 0 or 1 or greater (preferably 1 to 9 or greater); L represents the residue of an aminocarboxylic acid or hydroxycarboxylic acid (as resulting from removal of an amino or hydroxyl group and a carboxyl group) or the residue of a lactam or lactone (as resulting from removal of an amide or ester bond); L$^1$ represents the residue of a polycarboxylic acid (as resulting from removal of two carboxyl groups); L$^2$ represents the residue of a diamine or diol (as resulting from removal of an amino or hydroxyl group); f represents an integer of 0 or 1 or greater; L$^3$ represents the residue of a PA, polyol or PI whose valence is (1+f) (as resulting from removal of an amino, hydroxyl or isocyanate group) or the group resulting from epoxy ring opening (the group formed upon ring opening of an epoxide); p represents 1 or 2; and G represents —O— (when L is the residue of a hydroxycarboxylic acid or lactone, L$^2$ is the residue of a diol and/or L$^3$ is the residue of a polyol or the group resulting from ring opening of an epoxide) or —NH— (when L is the residue of an aminocarboxylic acid or lactam, L$^2$ is the residue of a diamine and/or L³ is the residue of a PA or PI) [G bound to (-E-)$_p$ being >N— when L³ is the residue of a PA and p is 2] [namely, (-E-)$_p$G- being an ester bond, amide bond or imide bond]. In the preceding and succeeding descriptions, when one and the same symbol appears two or more times, the two or more groups/atoms represented thereby may be the same or different.

Examples of the group resulting from epoxy ring opening include —CH$_2$—CH(OH)—CH$_2$— and groups resulting from polyepoxy ring opening, for example groups of the formula —CR$^4$—CR$^5$-J-(CR$^5$—CR$^4$—)$_f$ [in which J is the residue of a polyepoxide (as resulting from removal of an epoxy group); one of R$^4$ and R$^5$ (e.g. R$^5$) is OH and the other (e.g. R$^4$) is H, or both of them (e.g. two R$^4$s) may be bound to each other or to J to form a ring (when J is the residue of an alicyclic polyepoxide)].

Preferred as the carboxy-modified polyolefin (ax) is (ax1), in particular an unsaturated dicarboxylic acid (anhydride)-modified polyolefin.

The degree of carboxy modification of (ax) is not particularly restricted but (ax) preferably has an acid value of 2 to 100 (mg KOH/g; hereinafter the same shall apply), more preferably 8 to 80, most preferably 15 to 60 in view of the dispersion ability.

Examples of the above polyol include dihydric to octahydric or further hydric high-molecular-weight polyols (having a OH equivalent of 250 or higher), low-molecular-weight polyols (having a OH equivalent of lower than 250), and mixtures of two or more these.

The low-molecular-weight polyols include polyhydric alcohols and low-molecular-weight OH-terminated polymers (polyether polyols (hereinafter abbreviated as "PT polyols", and polyester polyols (hereinafter abbreviated as "PS polyols").

The polyhydric alcohols include the following.

Dihydric alcohols (C2-20 or higher), for example C2-12 aliphatic divalent alcohols [(di)alkylene glycols, e.g. ethylene glycol, diethylene glycol, propylene glycol, dipropylene glycol, 1,2-, 2,3-, 1,3- and 1,4-butanediol, 1,6-hexanediol, neopentyl glycol and 3-methylpentanediol (hereinafter abbreviated as "EG", "DEG", "PG", "DPG", "BD", "HD", "NPG" and "MPD", respectively), dodecanediol, etc.]; C6-10 alicyclic dihydric alcohols [1,4-dyclohexanediol, cyclohexanedimethanol, etc.]; C8-20 aromatic dihydric alcohols [xylylene glycol, bis(hydroxyethyl)benzene, etc.];

Trihydric to octahydric or further polyhydric alcohols, for example (cyclo)alkanepolyols and intramolecular or intermolecular dehydration products derived therefrom [glycerol, trimethylolpropane, pentaerythritol, sorbitol and dipentaerythritol (hereinafter abbreviated as "GR", "TMP", "PE", "SO" and "DPE", respectively), 1,2,6-hexanetriol, erythritol, cyclohexanetriol, mannitol, xylitol, sorbitan, diglycerol, other polyglycerols, etc.], sugars and derivatives thereof [e.g. sucrose, glucose, fructose, mannose, lactose, and glycosides (methylglucoside etc.)]; nitrogen-containing polyols (tertiary amino group-containing polyols and quaternary ammonium group-containing polyols): nitrogen-containing diols, for example bishydroxyalkyl (C2-4) derivatives of C1-12 aliphatic, alicyclic and aromatic primary monoamines [methylamine, ethylamine, 1- and 2-propylamine, (iso)amylamine, hexylamine, 1,3-dimethylbutylamine, 3,3-dimethylbutylamine, 1-, 2- and 3-aminoheptane, nonylamine, decylamine, undecylamine, dodecylamine, cyclopropylamine, cyclopentylamine, cyclohexylamine, aniline, benzylamine, etc.] [bis (2-hydroxyethyl) derivatives, bis(hydroxypropyl) derivatives, etc., e.g. tertiary nitrogen atom-containing polyols described in U.S. Pat. No. 4,271,217], and quaternization products derived therefrom [products of quaternization with those quaternizing agents or dialkyl carbonates (dimethyl carbonate, etc.) described in the above-cited U.S. Patent], for example, quaternary nitrogen atom-containing polyols described in the above-cited U.S. Patent; and trihydric to octahydric or further polyhydric nitrogen-containing polyols, for example trialkalnol(C2-4)amines (triethanolamine etc.) and polyhydoxyalkyl(C2-4) derivatives of C2-12 aliphatic, alicyclic, aromatic and heterocyclic PAs [those species described later herein, for example ethylenediamine, tolylenediamine, aminoethylpiperazine] [poly(2-hydroxyethyl) derivatives, bis(hydroxypropyl) derivatives, etc.: e.g. tetrakis(2-hydroxypropyl)ethylenediamine and pentakis(2-hydroxypropyl)diethylenetriamine], and quaternization products similar to those described hereinabove;

Sulfo group-containing polyols: products derived from the above-mentioned dihydric or trihydric to octahydric or further polyhydric alcohols by sulfo group introduction, for example sulfoglycerol, sulfoerythritol, sulfodi(hydroxymethyl)benzene, sulfodi(hydroxyethyl)benzene, sulfodi(hydroxypropyl)benzene, sulfohydroxymethylhydroxyethylbenzene, and salts thereof.

The salt to be mentioned herein include metal salts, for example alkali metal (e.g. lithium, sodium, potassium), alkaline earth metal (e.g. calcium, magnesium) and group IIB metal (e.g. zinc) salts; ammonium salts; and amine salts and quaternary ammonium salts.

Examples of the salt-forming amine include C1-20 amines, for example such hydroxylamines {C2-10, for example, (di) alkanol amine, cycloalkanol amine and alkyl alkanol amine [e.g. 2-aminoethanol, 3-aminopropanol, 1-amino-2-propanol, 4-aminobutanol, 5-aminopentanol, 6-aminohexanol, diethanolamine, di-n- and i-propanolamine, 3-aminomethyl-3,5,5-trimethyl cyclohexanol, methyl ethanolamine, and ethyl ethanolamine]}, tertiary amino group-containing diols and primary monoamines, secondary monoamines (dialkyl amine, morpholine, etc.), and alkylation (C1-4) and/or hydroxyalkylation (C2-4) products [or alkylene oxide (hereinafter abbreviated as "AO") adducts thereof]: for example, mono-, di- and tri(hydroxyl)alkyl(amines) (mono-, di- and triethanolamine and ethylamine, diethylethanolamine, morpholine, N-methylmorpholine, N-hydroxyethylmorpholine, etc.). The quaternary ammonium salts include quaternization products derived from these amines [products of quaternization with quaternizing agents or dialkyl carbonates (dimethyl carbonate, etc.) described in U.S. Pat. No. 4,271,217].

Examples of the AO include C2-12 or higher (preferably C2-4) AOs, for example ethylene oxide, 1,2-propylene oxide, 1,2-, 2,3- and 1,3-butylene oxide, tetrahydrofuran and 3-methyltetrahydrofuran (hereinafter abbreviated as "EO", "PO", "BO", "THF" and "MTHF", respectively), 1,3-propylene oxide, iso-BO, C5-12 α-olefin oxides, substitutes AOs, for example styrene oxide and epihalohydrins (epichlorohydrin etc.), and combinations of two or more of these (random addition(s) and/or block addition(s)). Examples of the hydroxycarboxylic acid include those species mentioned hereinabove.

The low-molecular-weight OH-terminated polymers include such PT polyols, PS polyols and polyurethane (hereinafter abbreviated as "PU") polyols [reaction products derived from a PI and an excess (1 mole per isocyanate group) of a polyhydric alcohol] having a OH equivalent of less than 250 as mentioned later herein. For example, there may be mentioned low-molar AO adducts of low-polymerization-degree AO ring opening polymers and active hydrogen-containing polyfunctional compounds [e.g. PEG, PPG, PTMG, etc., and such EO (2 to 4 moles) adducts of bis(hydroxyethoxy)benzene and bisphenol A as mentioned later herein], low-molar lactone adducts derived from low-condensation-degree PS polyols and polyols [e.g. caprolactone (1 mole) adducts of condensation products from a polycarboxylic acid and an excess (1 mole per carboxyl group) of a polyhydric alcohol (e.g. dihydoxyethyl adipate), and of EG], and low-polymerization-degree PU polyols (e.g. reaction products from 1 mole of TDI and 2 moles of EG).

The high-molecular-weight polyol generally has a OH equivalent (molecular weight per OH as calculated based on the OH value) of 250 to 3,000 or greater. The polyol generally has a Mn of 500 to 5,000 or higher, preferably 700 to 4,500. It preferably has a weight average molecular weight (as measured by GPC; hereinafter abbreviated as "Mw") of 500 to 6,000, more preferably 700 to 4,000. Examples thereof include OH-terminated polymers [PTs, PSs, polyamides (hereinafter abbreviated as "PDs"), PUs, vinyl polymers (hereinafter, "VPs") and polymer polyols (hereinafter abbreviated as, "P/P")], and mixtures of two or more of these.

The OH-terminated PTs include polymers resulting from ring opening polymerization of an AO, PT polyols having a structure resulting from addition of one or more AOs to an initiator having at least two (2 to 8 or more) active hydrogen atoms (AO adducts), and PT polyols resulting from coupling of two or more (same or different) molecules thereof by means of a coupling agent.

Examples of the initiator for AO addition include, for example, the above-enumerated polyhydric alcohols, hydroxylamines, aminocarboxylic acids and hydroxycarboxylic acids; polyhydric phenols; and polycarboxylic acids (to be mentioned later herein).

The polyhydric phenols include C6-18 dihydric phenols, for example monocyclic dihydric phenols (hydroquinone, catechol, resorcinol, urushiol, etc.), bisphenols (bisphenol A, F, C, B, AD and S, dihydroxybiphenyl, 4,4'-dihydroxydiphenyl-2,2-butane, etc.), and condensed polycyclic dihydric phenols [dihydroxynaphthalene (e.g. 1,5-dihydoxynaphthalene), binaphthol, etc.]; as well as trihydric to octahydric or further polyhydric phenols, for example a monocyclic polyhydric phenol (e.g. pyrogallol, phloroglucinol) and low condensation products from a mono- or dihydric phenol (e.g. phenol, cresol, xylenol, resorcinol) and an aldehyde or ketone (e.g. formaldehyde, glutaraldehyde, glyoxal, acetone) (e.g. phenol or cresol novolak resins, resol intermediates, polyphenols obtained by condensation of phenol and glyoxal or glutaraldehyde, and polyphenols obtained by condensation of resorcinol and acetone).

Preferred among these are aliphatic dihydric alcohols and bisphenols, in particular ethylene glycol and bisphenol A.

The addition of the AO to the initiator can be carried out in the conventional manner. Thus, it is carried out in one step or two or more steps in the absence or presence of a catalyst (e.g. alkali catalyst, amine type catalyst, acidic catalyst) (in particular at the later stage of AO addition) at ordinary pressure or under pressure. The addition of two or more AOs may be carried out in the manner of random addition or block addition or a combination of both (e.g. random addition followed by block addition).

Examples of the coupling agent for coupling AO adducts include polyhalides, for example C1-6 alkane polyhalides (e.g. C1-4 alkylene dihalides: methylene dichloride, 1,2-dibromoethane, etc.); epihalohydrins (epichlorohydrin etc.); and polyepoxides (to be mentioned later herein).

Examples of the OH-terminated PTs include PT diols, for example polyalkylene glycols (hereinafter abbreviated as "PAGs") [e.g. polyethylene glycol, polypropylene glycol and polytetramethylene ether glycol (hereinafter abbreviates as "PEG", "PPG" and "PTMG", respectively), poly-3-methyltetramethylene ether glycol], copolymeric polyoxyalkylene diols [EO/PO copolymer diols, THF/EO copolymer diols, THF/MTHF copolymer diols, etc. (weight ratio: 1/9 to 9/1, for instance), aromatic ring-containing polyoxyalkylene diols [polyoxyalkylene bisphenol A (e.g. EO and/or PO adduct of bisphenol A)]; and trifunctional or further polyfunctional PT polyols, for example polyoxypropylene triols (e.g. PO adducts of GR); as well as products of coupling of one or more of these using methylene dichloride.

The OH-terminated PSs include condensed PS polyols, polylactone (hereinafter, "PL") polyols, castor oil-based polyols [castor oil (ricinolic acid triglyceride) and polyol modifications thereof], and polycarbonate polyols.

The condensed PS polyols can be produced by polycondensation of a polyol and a polycarboxylic acid (if necessary together with a hydroxycarboxylic acid) or reaction of a polyol with a polycarboxylic acid anhydride and an AO; the PL polyols by ring opening addition of a lactone with a polyol as an initiator (or polycondensation of a polyol and a hydroxycarboxylic acid); the polyol modifications of castor oil by transesterification between castor oil and a polyol; and the polycarbonate polyols by ring opening addition/polycondensation of an alkylene carbonate using a polyol as an initiator, polycondensation (transesterification) of a polyol with diphenyl or dialkyl carbonate, or reaction of a polyol or a dihydric phenol (any of those enumerated above: e.g. bisphenol A) with phosgene.

The polyol to be used for the production of PSs generally has a OH equivalent of not higher than 1,000, preferably 30 to 500. Examples include the above-mentioned polyhydric alcohols [diols (e.g. EG, 1,4-BD, NPG, HD and DEG) and trihydric or further polyhydric polyols (GR, TMP, PE, etc.)], the above-mentioned PT polyols (PEG, PPG, PTMG, etc.), and mixtures of two or more of these. Preferred in the production of condensed PS polyols are diols and combinations of a diol and a small proportion (e.g. not larger than 10 equivalent percent) of a trihydric or further polyhydric polyol.

Examples of the polycarboxylic acid include dicarboxylic acids and tribasic or tetrabasic or further polybasic polycarboxylic acids. Examples thereof include C2-30 or higher (preferably C2-12) saturated or unsaturated aliphatic polycarboxylic acids, for example C2-15 dicarboxylic acids (e.g. oxalic, succinic, malonic, adipic, suberic, azelaic, sebacic, dodecanedicarboxylic, maleic, fumaric and itaconic acid), C6-20 tricarboxylic acids (e.g. tricarballylic and hexanetricarboxylic acid)]; C8-15 aromatic polycarboxylic acids, for example dicarboxylic acids (e.g. terephthalic, isophthalic and phthalic acid), tri- and tetracarboxylic acids (e.g. trimellitic and pyromellitic acid); C6-40 alicyclic polycarboxylic acids (dimer acid etc.); and sulfo group-containing polycarboxylic acids [derivatives of the above-mentioned polycarboxylic acids as resulting from sulfo group introduction, e.g. sulfosuccinic, sulfomalonic, sulfoglutaric, sulfoadipic and sulfoisophthalic acid, and salts thereof (same salts as those mentioned above referring to sulfo group-containing polyols)]; as well as carboxy-terminated polymers.

The carboxy-terminated polymers include PT polycarboxylic acids, for example carboxymethyl ethers of polyols [the above-mentioned polyhydric alcohols, PT polyols, etc.] (as obtained by reacting with monochloroacetic acid in the presence of an alkali); and PD, PS and/or PU polycarboxylic acids, for example polylactam-polycarboxylic acids and PL polycarboxylic acids obtained by ring opening polymerization of a lactam or lactone (mentioned above) with such a polycarboxylic acid as mentioned above, for instance, as an initiator, condensed PS polycarboxylic acids and condensed PD polycarboxylic acids resulting from coupling (esterification or amidation) of two or more molecules of any of the polycarboxylic acids mentioned above with a polyol (as mentioned above) or a PA or PI (to be mentioned later herein), and PU polycarboxylic acids obtained by reacting (in the manner of urethane formation and esterification or amidation) such a polycarboxylic acid and polyol as mentioned above with a PI.

Examples of the ester-forming derivative include acid anhydrides, lower alkyl (C1-4) esters and acid halides, for example succinic, maleic, itaconic and phthalic anhydride, dimethyl terephthalate and malonyl dichloride.

Preferred for the production of the condensed PS polyols are dicarboxylic acids and combinations of a dicarboxylic acid and a small proportion (e.g. not larger than 10 equivalent percent) of a tribasic or tetrabasic or further polybasic polycarboxylic acid.

The lactone and hydroxycarboxylic acid include those respectively enumerated hereinabove.

Examples of the alkylene carbonate include those comprising a C2-6 alkylene group, for example ethylene and propylene carbonate. Examples of the dialkyl carbonate include those comprising C1-4 alkyl groups, for example dimethyl, diethyl and di-isopropyl carbonate.

Specific examples of the OH-terminated PSs include polyethylene adipate, polybutylene adipate, polyhexamethylene adipate, polyneopentyl adipate, polyethylene/propylene adipate, polyethylene/butylene adipate, polybutylene/hexamethylene adipate, polydiethylene adipate, poly(polytetramethylene ether) adipate, polyethylene azelate, polyethylene sebacate, polybutylene azelate, polybutylene sebacate, polycaprolactone diol and polyhexamethylene carbonate diol.

The OH-terminated PDs include poly(ester)amide polyols resulting from polycondensation of a polycarboxylic acid (such as mentioned above) with a hydroxylamine (such as mentioned above) or a polyol (such as mentioned above) and a PA (to be mentioned later herein).

The OH-terminated PUs include OH-terminated urethane prepolymers resulting from modification of polyols with a PI. The polyols include the above-mentioned polyhydric alcohols, high-molecular-weight polyols (the above-mentioned OH-terminated PTs and PSs and those OH-terminated VPs and P/Ps which are to be mentioned later herein), and combinations of two or more of these. Preferred are high-molecular-weight polyols (in particular OH-terminated PSs, and particularly PTs) and combinations thereof with a low-molecular-weight polyol (in particular a polyhydric alcohol). The amount of the low-molecular-weight polyol to be used in combination may adequately be varied according to the intended use of and the performance characteristics required. Generally, however, the amount is preferably 0.01 to 0.5 equivalent, more preferably 0.02 to 0.4 equivalent, most preferably 0.1 to 0.2 equivalent, relative to each equivalent of the high-molecular-weight polyol. In producing the OH-terminated urethane prepolymers, the equivalent ratio between polyol and PI (OH/NCO ratio) is generally 1.1 to 10, preferably 1.4 to 4, more preferably 1.4 to 2. The polyol and PI may be reacted with each other either in one step or in two or more steps (e.g. part of the polyol or PI is subjected to reaction and the remainder is then subjected to reaction).

Examples of the PI include those PIs having 2 to 6 or more (preferably 2 or 3, more preferably 2) isocyanate groups which are enumerated below, and mixtures of two or more of these.

C2-18 (exclusive of the carbon atoms in the NCO groups; hereinafter the same shall apply) aliphatic PIs: diisocyanates (hereinafter abbreviated as "DIs"), for example ethylene DI, tetramethylene DI, hexamethylene DI (HDI), heptamethylene DI, octamethylene DI, decamethylene DI, dodecamethylene DI, 2,2,4- and/or 2,4,4-trimethylhexamethylene DI, lysine DI, 2,6-diisocyanatemethyl caproate, 2,6-diisocyanateethyl caproate, bis(2-isocyanateethyl) fumarate and bis(2-isocyanateethyl) carbonate; and trifunctional and further polyfunctional PIs (triisocyanates etc.), for example 1,6,11-undecanetriisocyanate, 1,8-diisocyanate-4-isocyanatemethyloctane, 1,3,6-hexamethylenetriisocyanate and lysine ester triisocyanates (lysine-alkanolamine reaction products further reacted with phosgene), 2-isocyanateethyl-2,6-diisocyanatehexanoate, 2- and/or 3-isocyanatepropyl-2,6-diisocyanatehexanoate, etc.);

C4-15 alicyclic PIs: DIs, for example isophorone-DI (IPDI), dicyclohexylmethane-4,4'-DI (hydrogenated MDI), cyclohexylene DI, methylcyclohexylene DI, bis(2-isocyanateethyl)-4-cyclohexylene-1,2-dicarboxylate and 2,5- and/or 2,6-norbornane-DI; and trifunctional or further polyfunctional PIs (triisocyanates etc.), for example bicycloheptanetriisocyanate;

C8-15 araliphatic PIs: m- and/or p-xylylene DI (XDI), diethylbenzene-DI and α,α,α',α'-tetramethylxylylene DI (TMXDI);

C6-20 aromatic PIs: DIs, for example 1,3- and/or 1,4-phenylene DI, 2,4- and/or 2,6-tolylene DI (TDI), 4,4'- and/or 2,4'-diphenylmethane-DI (MDI), m- and p-isocyanatephenylsulfonyl isocyanate, 4,4'-diisocyanatebiphenyl, 3,3'-dimethyl-4,4'-diisocyanatebiphenyl, 3,3'-dimethyl-4,4'-diisocyanatediphenylmethane and 1,5-naphthylene DI; and trifunctional and further polyfunctional PIs (triisocyanates etc.), for example crude TDI, crude MDI (polymethylenepolyphenylene polyisocyanate); and Modifications of PIs: modifications of the above PIs (e.g. CD, urethane, urea, isocyanurate, uretimine, allophanate, biuret, oxazolidone and/or uretodione group-containing modifications), for example urethane modifications of MDI, TDI, HDI, IPDI and the like (NCO-terminated urethane prepolymers obtained by reacting a polyol with the PI in excess), further, biuret modifications, isocyanurate modifications and trihydrocarbyl phosphate modifications thereof, and mixtures of these.

Examples of the polyol to be used for urethane modification include such polyhydric alcohols, PT polyols and/or PS polyols as mentioned above. Preferred are polyols having a OH equivalent of not higher than 500, particularly 30 to 200, for example glycols (EG, PG, DEG, DPG, etc.), triols (TMP, GR, etc.), tetrafunctional and further polyfunctional polyols (PE, SO, etc.), and AO (EO and/or PO) (1 to 40 moles) adducts of these, in particular glycols and triols. The equivalent ratio between PI and polyol (NCO/OH ratio) in urethane modification is generally 1.1 to 10, preferably 1.4 to 4, more preferably 1.4 to 2.

The free isocyanate group content of the above-mentioned modified PIs is generally 8 to 33%, preferably 10 to 30%, more preferably 12 to 29%.

Preferred among the PIs from the light resistance viewpoint are non-aromatic (aliphatic, alicyclic and araliphatic) PIs, in particular aliphatic PIs, alicyclic PIs, and combinations of these.

The OH-terminated VPs include polybutadiene-based polyols, for example OH-terminated butadiene homopolymers and copolymers (styrene-butadiene copolymers, acrylonitrile-butadiene copolymers, etc.) [those having the 1,2-vinyl structure, those having the 1,4-trans structure, those having the 1,4-cis structure, and those having two or more of these structures (1,2-vinyl/1,4-trans/1,4-cis mole ratio: (100 to 0)/(100 to 0)/(100 to 0), preferably (10 to 30)/(50 to 70)/(10 to 30)) and hydrogenation products derived from these (degree of hydrogenation: e.g. 20 to 100%); acrylic polyols, for example hydroxyl group-containing acrylic copolymers [alkyl (C1-20) (meth)acrylate copolymers or such copolymers further comprising another monomer(s) (styrene, acrylic acid, etc.)] [hydroxyl group introduction being mainly based on the use of hydroxyethyl (meth)acrylate]; and partially hydrolyzed ethylene/vinyl acetate copolymers.

The P/Ps are obtained by polymerizing an ethylenically unsaturated monomer(s) in situ in a polyol(s) (such a OH-terminated PT(s) and/or PS(s) as mentioned above, or a mixture of the same and such a polyhydric alcohol(s) as mentioned above). Examples of the ethylenically unsaturated monomer include acrylic monomers, for example (meth) acrylonitrile and alkyl (C1-20 or higher) (meth)acrylates (methyl methacrylate etc.); hydrocarbon (hereinafter abbreviated as "HC") monomers, for example unsaturated aromatic HCs (styrene etc.) and unsaturated aliphatic HCs (C2-20 or higher alkenes, alkadienes, etc., e.g. α-olefins and butadiene); and combinations of two or more of these [e.g. acrylonitrile/styrene combination (weight ratio: 100/0 to 80/20)]. The P/Ps has a polymer content of, for example, 5 to 80% or higher, preferably 30 to 70%.

Preferred among the high-molecular-weight polyols are PT polyols and PS polyols.

The PAs include primary and/or secondary PAs, for example aliphatic (C2-18), alicyclic (C4-15), araliphatic (C8-15) and aromatic (C6-20) PAs, which correspond to the above-mentioned PIs (except for substitution of $NH_2$ for NCO); polyalkylene (C2-6) PAs (polymerization degree: 2 to 10 or higher), for example polyethylene PAs (diethylenetriamine, triethylenetetramine, tetraethylenepentamine, etc.), and corresponding polypropylene PAs; polymerized fatty acid PAs [PAs derived from fatty acid (linolic acid, linoleic acid, oleic acid, etc.) polymers (dimer acids etc.) (by hydrogenation of the corresponding amides or nitriles)]; amino-terminated polymers (mentioned below); partial (C1-10) alkylation products and/or hydroxyl(C2-4)alkylation products derived from these PAs (N-alkyldiamines, N,N'-dialkyldiamines, N-hydroxyalkyldiamines, N,N'-dihydroxyalkyldiamines, etc.); and heterocyclic PAs, for example piperazine, imidazolidine, pyrazolidine, etc., and N-aminoalkyl and N,N'-diaminoalkyl substitution derivatives thereof (aminoethylpiperazine etc.).

The amino-terminated polymers include amino-terminated PTs, for example C3-10 (preferably C3) aminoalkyl ethers of the above-mentioned polyols (polyhydric alcohols, PT polyols, etc.) [hydrogenation products of the cyanoalkylation (cyanoethylation etc.) products]; amino-terminated PDs, for example amino-terminated condensed PDs [obtained from the above-mentioned PAs by polycondensation with a polycarboxylic acid(s) (such as mentioned above)] and amino-terminated polylactams [obtained from the above-mentioned PAs by ring opening addition of or polycondensation with an initiator and a lactam(s) or aminocarboxylic acid(s) (such as mentioned above)].

Preferred as PA are diamines (hereinafter, "DAs"), in particular aliphatic DAs. More preferred are C2-12 ones [ethylene-DA (hereinafter abbreviated as "EDA"), hexamethylene-DA, heptamethylene-DA, octamethylene-DA and decamethylene-DA]. EDA is most preferred.

Polyepoxides include the following.

(1) Aliphatic polyepoxides: polyglycidyl ethers of aliphatic polyols (hereinafter glycidyl ether is abbreviated to as "GE") [such dihydric to octahydric or further polyhydric alcohols and PT polyols as mentioned above]: di-GEs (e.g. di-GEs of EG, PG, 1,4-BD, HD, MPD, DEG, NPG, PEG (Mn 150 to 200,000) and PPG (Mn 134 to 200,000)], tri-GEs [e.g. tri-GEs of GR and TMP], and tetravalent or higher polyvalent GEs [e.g. PE tetra-GE and SO hexa-GE]; polyglycidyl esters (hereinafter glycidyl ester is abbreviated to as "GS") of aliphatic polycarboxylic acids (dibasic or tribasic or further polybasic aliphatic polycarboxylic acids such as mentioned hereinabove referring to the productions of PSs) [e.g. oxalic acid and adipic acid di-GS, and tricarballylic acid tri-GS], and glycidyl (meth)acrylate polymers and copolymers of glycidyl (meth)acrylates and another monomer {e.g. unsaturated HCs (aliphatic HCs, alicyclic HC, aromatic HC, etc.), alkyl(meth) acrylate [those having a C1-50 alkyl group, for example methyl, ethyl, propyl, butyl, 2-ethylhexyl, dodecyl, hexadecyl, heptadecyl and eicosyl (meth)acrylate], and carbonyl-, ether- and/or sulfur-containing unsaturated monomers [e.g. unsaturated ester, unsaturated ether, vinyl ketone, sulfide coupling-containing monomers and sulfonic group-containing monomers], etc. preferably alkyl (meth)acrylate} (Mn being preferably 300 to 10,000, more preferably 500 to 5,000; comonomer ratio being preferably 2/98 to 80/20, more preferably 5/95 to 50/50); epoxidized animal and vegetable oils (e.g. epoxidized soybean oil);

(2) Alicyclic polyepoxides: C8-20 ones, for example vinyl-cyclohexene dioxide, limonene dioxide, dicyclopentadiene dioxide, bis(2,3-epoxycyclopentyl) ether, EG bisepoxydicyclopentyl ether, 3,4-epoxy-6-methylcyclohexylmethyl-3',4'-epoxy-6'-methylcyclohexanecarboxylate, bis(3,4-epoxy-6-methylcyclohexylmethyl) adipate, and nucleus hydrogenation products derived from the aromatic ring-containing polyepoxides mentioned below;

(3) Heterocyclic ring-containing polyepoxides: C5-20, for example trisglycidylmelamine;

(4) Aromatic ring-containing polyepoxides: poly-GEs of polyhydric phenols (dihydric or trihydric or further polyhydric phenols mentioned above) or AO adducts thereof: di-GEs of dihydric phenols (di-GEs of bisphenol F, A, B, AD and S, catechol di-GE, resorcinol di-GE, hydroquinone di-GE, 1,5-dihydroxynaphthalene di-GE, dihydroxybiphenyl di-GE, di-GE obtained by reacting 2 moles of bisphenol A with 3 moles of epichlorohydrin, etc.); tri-GEs of trihydric phenols (pyrogallol tri-GE etc.); and poly-GEs of tetrahydric or further polyhydric phenols (GEs of phenol or cresol novolak resins, poly-GEs of polyphenols obtained by condensation reaction between phenol and glyoxal, glutaraldehyde or formaldehyde, and poly-GEs of polyphenols obtained by condensation reaction between resorcin and acetone, etc.), etc.

Among these, aliphatic polyoepoxides and aromatic ring-containing polyepoxides, in particular TMP tri-GE, glycidyl (meth)acrylate polymers [(co)polymers from 10 to 100% of glycidyl (meth)acrylate and 0 to 90% of another monomer [the above-mentioned alkyl (meth)acrylate, in particular dodecyl methacrylate]; Mn 500 to 5,000] and bisphenol A di-GE, are preferred from the viewpoint of reactivity with (ax1).

More preferred among the above polyepoxides are those having 50 to 500, particularly 60 to 200 epoxy equivalent.

[Onium base (b) ]

The onium base (b) according to the present invention is formed from a compound (b11) containing a functional group reactive with a carboxyl group (a hydroxyl group, primary or secondary amino group, unsaturated group, etc.) and a tertiary amino group within the molecule and/or a compound (b12) containing a functional group reactive with a carboxyl group (same as defined above) and a tertiary phosphino group within the molecule, and a quaternizing agent or dialkyl carbonate (b2).

(b11) includes ones containing a primary or secondary amino group and tertiary amino group [C4-69, for example, N,N-dimethyl-1,3-propanediamine, N,N-dimethyl-p-phenylene diamine, N,N-diethyl-1,3-propanediamine, N,N-dibuthyl-1,3-propanediamine and a reaction product derived from a compound containing a tertiary amino group and carboxyl group (e.g. m-dimethylaminobenzoic acid) and polyamine (C2-18, e.g. ethylenediamine and 1,3-propanediamine) (monoamides)]; ones containing a hydroxyl group and tertiary amino group [C4-69, e.g. 2-dimethylaminoethanol, 2-diethylaminoethanol, m-dimethylaminophenol, N,N-diethylethanolamine, and a reaction product derived from a compound containing a tertiary amino group and carboxyl group (same as defined above) and polyol (C2-30, e.g. ethylene glycol, 1,6-hexanediol, and glycerol) (monoesters)]; and ones containing an unsaturated group and tertiary amino group [C6-51, e.g. 2-(dimethylamino)ethyl acrylate and 2-(dimethylamino)ethyl methacrylate].

(b12) includes ones containing a primary or secondary amino group and tertiary phosphino group {C4-69, e.g. ones prepared by hydrogenation of a reaction product derived from tris[hydroxyalkyl(C1-12)] phosphine (C3-18) and acrylonitrile with a Raney nickel, etc., ones prepared by alkylation thereof using alkyl chloride (C1-18) in the molar ratio of 1/1, ones containing a hydroxyl group and tertiary phosphino group [C3-40, e.g. tris(hydroxymethyl)phosphine and tris (hydroxypropyl)phosphine]; and ones containing an unsaturated group and tertiary phosphino group [C6-69, e.g. diphenyl(p-vinylphenyl)phosphine].

Among these, preferred are ones containing a primary or secondary amino group in view of thermal stability and hydrolyzation resistance of the modified polyolefin (A). More preferred among (b11) in view of onium base concentration in (A) are ones containing a primary or secondary amino group and tertiary amino group, and particularly preferred are N,N-dimethyl-1,3-propanediamine, N,N-diethyl-1,3-propanediamine and N,N-dibutyl-1,3-propanediamine, and most preferred is N,N-dibutyl-1,3-propanediamine.

In the quaternizing agent or dialkyl carbonate (b2), quaternizing agent includes those described in U.S. Pat. No. 4,271,217, for example an alkylation agent [e.g. halide (C1-12, e.g. methyl chloride, ethyl bromide, ethyl chloride and benzyl chloride), and dialkyl sulfate (C2-36, e.g. dimethyl sulfate and diethyl sulfate)].

Dialkyl carbonate includes ones containing C1-18 alkyl group, for example, dimethyl-, diethyl- and di-i-propyl carbonate.

As a method for quaternizing (b11) and/or (b12), there may be mentioned (i) which comprises directly reacting (b11) and/or (b12) with (b2), (ii) which comprises reacting (b11) and/or (b12) with (b2) such as dimethyl carbonate comparatively easily reactive therewith, and then mixing with other acids {organic acids [e.g. sulfonic acids (aliphatic (C1-24, e.g. methane sulfonic acid and ethane sulfonic acid) and aromatic (C6-24, e.g. benzene sulfonic acid and dodecyl benzene sulfonic acid)), alkyl sulfate (C1-24, e.g. methyl sulfate, ethyl sulfate and dodecyl sulfate) and alkyl phosphate (C1-36, e.g. monomethyl phosphate, diethyl phosphate and dioctyl phosphate)], and inorganic acids (hydrochloric acid, sulfuric acid, nitric acid and phosphoric acid)} to subject the resultant to anion exchange, and (iii) which comprises reacting (b11) and/or (b12) with (b2) in the presence of an alkaline metal hydroxide (e.g. sodium hydroxide and potassium hydroxide) and using the counter ion as a hydroxyl ion.

Among those mentioned above, preferred in view of convenience is the method (i).

Moreover, as the order of reaction, there may be mentioned (1) which comprises reacting (b11) and/or (b12) with a carboxy-modified polyolefin (ax) and then quaternizing thereof, and (2) which comprises quaternizing (b11) and/or (b12), and then reacting the resultant with (ax). Preferred among these is the method (1) which hardly causes side reaction.

Among the above (b), preferred are those having the structure represented by the following general formula (1) in view of affinity with fillers and facility of insertion between clay layers having a layer structure.

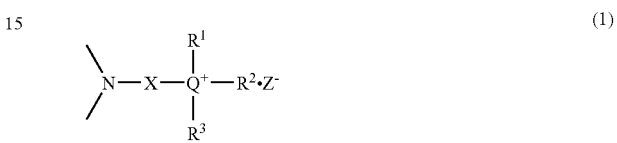

[in the formula, $R^1$, $R^2$ and $R^3$ represent C1-15 (preferably C1-4) alkyl (methyl, ethyl, propyl, butyl, hexyl, etc.), alkenyl (propenyl, butenyl, etc.), cycloalkyl (cyclopentyl, cyclohexyl, etc.), cycloalkenyl (cyclopentenyl, cyclohexenyl, etc.), phenyl, aryl alkyl (benzyl, phenylethyl, etc.), or alkyl aryl (toluyl, ethyl phenyl, etc.) group which may be substituted with a hydroxyl group, and preferred among these is an alkyl group.

X represents C2-15 (preferably C2-6) alkylene (ethylene, propylene, hexylene, etc.), alkylidene (ethylidene, propylidene, butylidene, hexylidene, etc.), cycloalkylene (cyclopentylene, cyclohexylene, etc.) or, cycloalkylidene (cyclopentylidene, cyclohexilidene, etc.), arylene (phenylene, biphenylene, etc.), aryl alkylene (xylylene, etc.) or alkyl arylene group (toluylen, etc.) group, and an alkylene group is preferred among these.

Q represents N or P, and preferred is N.

Z represents a counter anion [halogen (Cl, Br, etc.) ion, alkyl sulfate (methyl sulfate, ethyl sulfate, etc.) ion, etc.], and preferred is an alkyl sulfate ion.

[Modified polyolefin (A)]

The modified polyolefin (A) of the present invention contains a hydrophobic group comprising the polyolefin (a) and a hydrophilic group containing at least one onium base (b) mentioned above, and the lower limit of Mn per (b) is 750, preferably 1,000, more preferably 1,500, particularly preferably 2,000, and the upper limit is 50,000, preferably 40,000, more preferably 30,000, particularly preferably 20,000. When the Mn per (b) is below 750 or exceeds 50,000, the filler dispersion ability becomes deteriorated.

(A) can be produced by the following method, for example.

(1) a production method which comprises reacting the carboxy-modified polyolefin (ax) with (b11) and/or b12) to obtain monoamide and/or monoester, and then quaternizing the tertiary amino group and/or tertiary phosphino group with (b2).

(2) a production method which comprises quaternizing (b11) and/or (b12) with the quaternizing agent (b2), and then reacting the resultant with the carboxy-modified polyolefin (ax) to obtain monoamide and/or monoester.

In the production method (1), the functional group equivalent ratio in the reaction between (ax) and (b11) and/or b12) [COOH/(NH$_2$, OH and/or unsaturated group)] is preferably 1/0.2 to 1/8, more preferably 1/0.5 to 1/4 in view of dispersibility and mechanical and thermal characteristics of a resin molding.

In the production method (2), the functional group equivalent ratio in the reaction between (ax) and quaternized (b11) and/or (b12) [COOH/(NH$_2$, OH and/or unsaturated group)] is preferably 1/0.2 to 1/8, more preferably 1/0.5 to 1/4 from the same viewpoint mentioned above.

The modifier for resins of the invention comprises the above dispersant (I) or coatability improver (II) and a filler.

The filler includes a metal oxide, metal hydroxide, metal carbonate, metal lead sulfate, metal silicate, metal nitride, carbons and other fillers.

As the metal oxide, there may be mentioned silica (silica balloon, etc.), diatom earth, alumina, zinc oxide, titanium oxide, calcium oxide, magnesium oxide, iron oxide, tin oxide, antimony oxide, etc.;

as the metal hydroxide, there may be mentioned calcium hydroxide, magnesium hydroxide, aluminum hydroxide, basic magnesium carbonate, etc.;

as the metal carbonate, there may be mentioned calcium carbonate, magnesium carbonate, zinc carbonate, barium carbonate, dawsonite, hydrotalcite, etc.;

as the metal sulfate, there may be mentioned calcium sulfate (gypsum fiber, etc.), barium sulfate, etc.;

as the metal silicate, there may be mentioned calcium silicate, clay (montmorillonite, bentonite, active white clay, etc.), talc, mica, sepiolite, imogolite, sericite, glass (fiber, beads, etc.);

as the metal nitride, there may be mentioned aluminum nitride, boron nitride, silicon nitride, etc.;

as the carbons, there may be mentioned carbon black, graphite, fullerene, carbon fiber, carbon balloon, charcoal powder, etc.;

as other fillers, there may be mentioned metal powders (gold, silver, copper, tin, etc.), potassium titanate, zinc titanate, lead zirconate, aluminum borate, molybdenum sulfide, silicon carbide, stainless steel fibers, zinc borate, slag fibers, teflon powders, wood flours, pulp, rubber powders, aramid fibers, etc.

These fillers may be used alone, or two or more of the may also be used in combination.

Among these, preferred are calcium carbonate and metal silicate, particularly clay in view of modification effect of resins to which the modifier for resin of the invention can be applied. Herein, "clay" refers to one containing hydrous silicate as a main component, and includes those having layer structure or non-layer structure.

As clay having a layer structure, there may be mentioned, for example, montmorillonite, saponite, hectorite, beidellite, stevensite, nontronite, vermiculite, halloysite, and expansive mica. As clay having a non-layer structure, there may be mentioned, for example, allophane, hisingerite, etc.

Preferred among these are clay having the layer structure in view of the resin modification effect, and more preferred are montmorillonite and saponite.

Filler (in particular clay) to be used in the invention may be either those have been treated (i.e. organized, hereinafter the same shall apply) with a dispersant having an organification effect to fillers (hereinafter abbreviated as a filler organification dispersant) in advance, or those have not been treated. Among these, preferred in view of capable of exerting the resin modification effect of the dispersant (I) according to the invention are filler (in particular clay) which have not been organized.

Furthermore, Filler (in particular clay) to be used in the invention may be either those have been treated (i.e. mixed, hereinafter the same shall apply) with other coatability improver (B6) being described below in advance, or those have not been treated. Among these, preferred in view of capable of exerting the resin modification effect of the coatability improver (II) according to the invention are filler (in particular clay) which have not been treated with (B6) in advance.

As the above filler organification dispersant, there may be mentioned salts of amines {for example, aliphatic [C2-18, e.g. monoamine (octyl amine, dodecyl amine, stearyl amine, etc.) and diamine (ethylene diamine, hexylene diamine, etc.)], alicyclic [C6-40, e.g. monoamine (cyclohexyl amine, 2-methylcyclohexyl amine, etc.), and diamine (diaminocyclohexane, 1,3-cyclohexane bis(methylamine), etc.)] and aromatic (aliphatic) [C6-30, e.g. monoamine (aniline, p-toluidine, etc.) and diamine (1,3-phenylene diamine, 2,3-diaminotoluene, etc.)]} and acids {inorganic acids [e.g. hydrochloric acid, sulfuric acid, phosphoric acid and nitric acid] and organic acids [sulfonic acid (C1-18, e.g. methane sulfonic acid, hexyl sulfonic acid and dodecyl benzene sulfonic acid), carboxylic acids (C1-18, e.g. formic acid, lauric acid and stearic acid), etc.], and quaternary alkyl ammonium salt (C4-C72, e.g. octyl trimethyl ammonium chloride, dioctyl diethyl ammonium chloride, distearyl dimethyl ammonium chloride, distearyl dimethyl ammonium/methyl sulfate.

When clay is treated with the filler organification dispersant in advance to exert the resin modification effect, the level of use thereof is, based on the weight of clay, generally not more than 50%, and in view of the resin modification effect preferably not more than 10%, more preferably 0 to 8%.

As the method for treating clay, there may be mentioned (1) a method comprising mixing clay and the filler organification dispersant in a solvent for the dispersant such as warm water (e.g. 80° C.) and drying the mixture after the filtration, and (2) a method comprising adding a solvent for the dispersant such as water during mixing clay and filler organification dispersant using a twin-screw extruder, etc. (the temperature condition is generally 60 to 270° C.). Preferred is the method (1) by which the filler organification dispersant can be easily inserted between clay layers.

As for the ratio of the dispersant (I) or coatability improver (II) according to the invention in the modifier for resins of the invention, based on the weight of said modifier, the lower limit is preferably 5%, more preferably 10%, particularly preferably 20% in view of the resin modification effect. The upper limit is preferably 95%, more preferably 90%, particularly preferably 80% in view of handling easiness as a modifier.

Said modifier for resins comprises (I) or (II) and a filler in combination. The combination method includes [1] a method comprising preparing a modifier by mixing (I) or (II) and a filler in advance, preparing, if necessary, the below-mentioned composition for resin modification by further adding the additive (B) mentioned below to prepare a composition for resin modification, and then adding the resultant to resins, and [2] a method comprising adding (I) or (II), filler, and optionally the additive (B) mentioned below separately in random order.

As the method for producing a modifier in the method [1], there may be mentioned, for example, <1> a method comprising mixing (I) or (II), a filler and optionally a small amount of solvent such as water using, for example, a powder mixer (Henschel mixer, Nauta mixer, Banbury mixer [product name: product of Farrel Corporation], etc.), e.g. at 0 to 80° C., and then kneading the resultant using fusion kneading equipment {batch kneading machine (a reaction tank, etc.), continuous kneading machine [FCM (product name: product of Farrel Corporation), LCM (product name: Kobe Steel Co., Ltd.), CIM (product name: The Japan Steel Works, Ltd.) etc.], simple extruder, twin-screw extruder, etc.} at 120 to 220° C. for 5 to 30 minutes; and <2> a method comprising directly kneading (I) or (II), a filler and optionally a small amount of solvent such as water using the same fusion kneading equipment as mentioned above under the same conditions without carrying out the above powder mixing. The method <1> is preferred in view of kneading efficiency.

Moreover, among the obtained modifiers, preferred are those in which (I) or (II) is inserted between layers of clay, and more preferred is clay having the spacing between layers in which (I) or (II) is inserted being not less than 6 nm (particularly preferably not less than 20 nm, most preferably not less than 40 nm). Herein the "spacing of layers" refers to a spacing between layers of clay having a multiplayer structure, and represents the interplanar spacing d calculated from the value of 2θ (unit is °) determined by X ray diffraction equipment.

The above-mentioned preferable modifier is prepared by sufficiently kneading (I) or (II) and clay. The state that (I) or (II) is inserted between the layers of clay can be confirmed by the observation using X ray diffraction equipment and/or an electron microscope, and the extent of insertion of (I) or (II) is expressed by the interplanar spacing (spacing between layers) measured by X ray diffraction equipment. In the above combination methods [1] and [2] shown above, preferred is the method [1] in view of insertion efficiency of clay between layers. In the above methods [1] and [2], the method for adding the composition for resin modification, or (I) or (II) and clay, and further optionally (B), separately in random order is described later.

The composition for resin modification of the invention comprises said modifier for resins and further one or two or more additive (B) selected from the group consisting of a colorant (B1), reinforcing agent (B2), flatting agent (B3), flame retardant (B4), antistatic agent (B5), other coatability improver (B6), and other dispersant (B7), antioxidant (B8) and ultraviolet absorber (B9).

As the colorant (B1), there may be mentioned pigments, for example, white pigments (titanium oxide, zinc flower, barium sulfate, calcium carbonate, etc.), black pigments (carbon black, iron black, aniline black, etc.), yellow pigments (chrome yellow, cadmium yellow, iron oxide yellow, benzidine yellow, hanza yellow, oil yellow 2G, etc.), orange pigments (red yellow lead, chrom vermilion, cadmium orange, pyrazolone orange, etc.), red pigments (colcothar, cadmium red, permanent red, rake red C, carmine 6B, pigment scarlet 3B, permanent red F5R, quinacridone red, thioindigo maroon, etc.), purple pigments (cobalt violet, mineral violet, etc.), blue pigments (ultramarine, Prussian blue, cobalt blue, phthalocyanine blue, etc.), green pigments (phthalocyanine green, chrom green, etc.), and metal powder pigments (aluminum powders, bronze powders, pearl essence, etc.).

As the reinforcing agent (B2), there may be mentioned metal powders (aluminum powder, copper powder, etc.), metal oxides (alumina, sand-lime stone, silica, talc, mica, calcined kaolin, etc.), metal hydroxides (aluminum hyoxide, etc.), metal salts (calcium carbonate, calcium silicate, etc.), fibers [inorganic fibers (carbon fibers, cellulose, α-cellulose, glass fiber, asbestos, etc.), organic fibers (cotton, jute, nylon, acrylics, rayon fibers, etc.), etc.], microballoon (glass, whitebait, phenolic resins, etc.), carbons (carbon black, graphite, coal powders, etc.), metal sulfides (molybdenum disulfide, etc.), organic powders (wood flours, etc.), and the like.

As the flatting agents (B3), there may be mentioned powdery, granular, amorphous, microballoon-shaped, fibrous, whisker-shaped or fine particle-shaped inorganic and organic flatting agents, for example, powdery, granular or amorphous ones (calcium carbonate, talc, clay, silicic acid, silicates, asbestos, mica, etc.), microballoon-shaped ones (glass, phenolic resin balloons, etc.), fibrous ones (glass fiber, carbon fiber, metal fibers, etc.), whisker-shaped ones (ceramic whisker, titanium whisker, etc.), and fine particle-shaped ones (plastic fine particles, e.g. polyolefin fine particle such as polyethylene and/or polypropylene), and the like.

As the flame retardants (B4), there may be mentioned organic ones {phosphate-containing ones [phosphate esters (tricresyl phosphate, etc.)], bromine-containing ones (tetrabromobisphenol A, decabromobiphenyl ether, etc.), chlorine-containing ones (chlorinated paraffin, HET acid anhydride, etc.), etc.}, and inorganic ones {antimony trioxide, magnesium hydroxide, borate salt, zinc borate, barium metaborate, aluminum hydroxide, red phosphorus, magnesium hydroxide, ammonium polyphosphate}, and the like.

The flame retardants include nonionic, cationic, anionic and amphoteric surfactants such as those enumerated below and those described in U.S. Pat. Nos. 3,929,678 and 4,331,447.

1) Nonionic surfactants:

AO-addition product nonionics, for example (poly)oxyalkylene derivatives of active hydrogen atom-containing compounds having a hydrophobic group (C8-24 or higher) [saturated and unsaturated, higher alcohols (C8-18), higher aliphatic amines (C8-24), higher fatty acids (C8-24), etc.; for example alkyl or alkenyl (dodecyl, stearyl, oleyl, etc.) alcohols and amines, and alkanoic or alkenoic acids (lauric, stearic and oleic acid, etc.)] [AO (C2-4, e.g. EO, PO, BO and combinations of two or more of these, in particular EO) (1 to 500 moles or a higher number of moles) adducts (molecular weight 174 to Mn 30,000) and higher fatty acid mono- and diesters of PAGs (e.g. PEG; molecular weight 150 to Mn 6,000)]; (poly)oxyalkylene derivatives of higher fatty acid (as mentioned above) esters of polyhydric alcohols [as described above, e.g. GR, PE and sorbitan] (as mentioned above; molecular weight 320 to Mn 30,000; e.g. Tween type nonionics); (poly)oxyalkylene derivatives of higher fatty acid (as described above) (alkanol)amides (as mentioned above; molecular weight 330 to Mn 30,000); (poly)oxyalkylene derivatives of polyhydric alcohol (as mentioned above) alkyl (C3-60) ethers (as mentioned above; molecular weight 180 to Mn 30,000); and polyoxyethylene derivatives of polyoxypropylene polyols [polyoxypropylene derivatives of polyhydric alcohols (as mentioned above) and of polyamines (the above-mentioned PAs) (e.g. PPG and ethylenediamine-PO adducts; Mn 500 to 5,000)] (Mn 1,000 to 30,000) [Pluronic type and Tetronic type nonionics]; polyhydric alcohol (C3-60) type nonionics, for example fatty acid (as mentioned above) esters of polyhydric alcohols (as mentioned above), polyhydric alcohol (as mentioned above) alkyl (C3-60) ethers, and fatty acid (as mentioned above) alkanolamides; and amine oxide type nonionics, for example (hydroxyl)alkyl(C10-18: e.g. dodecyl, stearyl, oleyl, 2-hydroxydodecyl)di(hydroxyl)alkyl (C1-3: e.g. methyl, ethyl, 2-hydroxyethyl)amine oxides.

2) Cationic surfactants:

Quaternary ammonium salt type cationics, for example tetraalkylammonium salts (C11-100), e.g. alkyl(C8-18: e.g. lauryl, stearyl)trimethylammonium salts and dialkyl(C8-18: e.g. decyl, octyl)dimethylammonium salts; trialkylbenzylammonium salts (C17-80), e.g. lauryldimethylbenzylammonium salts; alkyl(C8-60)pyridinium salts, e.g. cetylpyridinium salts; (poly)oxyalkylene(C2-4, polymerization degree 1 to 100 or higher)trialkylammonium salts (C12-100), e.g. polyoxyethylenelauryldimethylammonium salts; and acyl(C8-18)aminoalkyl(C2-4) to or acyl(C8-18)oxyalkyl (C2-4)tri[(hydroxyl)alkyl(C1-4)]ammonium salts, e.g. stearamidoethyldiethylmethylammonium salts (Sapamine type quaternary ammonium salts) [the salts mentioned above including, for example halides (chloride, bromide, etc.), alkyl sulfates (methosulfate, etc.) and salts with organic acids (such as mentioned below)]; and amine salt type cationics: salts of primary to tertiary amines [e.g. higher aliphatic amines (C12-60: lauryl-, stearyl- and cetylamine, hardened tallow amine, rosin amine, etc.), polyoxyalkylene derivatives (as mentioned above: e.g. EO adducts) of aliphatic amines (as mentioned above), and acylaminoalkyl- or acyloxyalkyl(as mentioned above)di(hydroxyl)alkyl(as mentioned above)amines (stearoyloxyethyldihydroxyethylamine, stearamidoethyldiethylamine, etc.)] with inorganic acids (hydrochloric acid, sulfuric acid, nitric acid, phosphoric acid, etc.) and organic acids (C2-22: acetic, propionic, lauric, oleic, succinic, adipic and azelaic acid, benzoic acid, etc.).

3) Anionic surfactants:

Carboxylic acids (salts), for example higher fatty acids (as mentioned above), ethercarboxylic acids [carboxymethylation products derived from higher alcohol (as mentioned above) or AO adducts thereof, for example EO (1 to 10 moles) adducts], and salts thereof; sulfate ester salts, for example sulfate ester salts of the above-mentioned higher alcohols or AO adducts thereof (alkyl and alkyl ether sulfates, sulfated oils (salts obtained by sulfation of natural unsaturated fats/oils or unsaturated waxes as such, followed by neutralization), sulfated fatty acid esters (salts obtained by sulfation of unsaturated fatty acid lower alcohol esters, followed by neutralization) and sulfated olefins (salts obtained by sulfation of C12-18 olefins, followed by neutralization); sulfonic acid salts, for example alkylbenzenesulfonic acid salts, alkylnaphthalenesulfonic acid salts, dialkyl sulfosuccinate type ones, α-olefin(C12-18)sulfonic acid salts and N-acyl-N-methyltaurines (Igepon T type ones, etc.); and phosphate ester salts, for example phosphate ester salts of the above-mentioned higher alcohols or AO-adducts thereof or of alkyl(C4-60)phenol-AO adducts (as mentioned above) (alkyl, alkyl ether and alkylphenyl ether phosphates).

4) Amphoteric surfactants:

Carboxylic acid (salt) type amphoterics, for example amino acid type amphoterics, e.g. alkyl(C8-18)aminopropionic acids (salts), and betaine type amphoterics, e.g. alkyl(as mentioned above)di(hydroxyl)alkyl(as mentioned above)betaines (alkyldimethylbetaines, alkyldihydroxyethylbetaines, etc.); sulfate ester (salt) type amphoterics, for example alkyl (as mentioned above)amine sulfate esters (salts), and hydroxyalkyl(C2-4: e.g. hydroxyethyl)imidazoline sulfate esters (salts); sulfonic acid (salt) type amphoterics, for example alkyl(as mentioned above: e.g. pentadecyl)sulfotaurines, and imidazolinesulfonic acid (salts); and phosphate ester (salt) type amphoterics, for example glycerol higher fatty acid (as mentioned above) ester phosphate esters (salts).

The salt moieties in the above-mentioned anionic and amphoteric surfactants include metal salts, for example alkali metal (e.g. lithium, sodium, potassium), alkaline earth metal (e.g. calcium, magnesium) and group IIB metal (e.g. zinc) salts; ammonium salts; and amine salts and quaternary ammonium salts.

Examples of the salt-forming amine include C1-20 amines, for example hydroxylamines, tertiary amino group-containing diols and primary monoamines, secondary monoamines, and alkylation (C1-4) and/or hydroxyalkylation (C2-4) products (AO adducts): for example, mono-, di- and tri(hydroxyl)alkyl(amines) (mono-, di- and triethanolamine and ethylamine, diethylethanolamine, morpholine, N-methylmorpholine, N-hydroxyethylmorpholine, etc.). The quaternary ammonium salts include quaternization products derived from these amines [products of quaternization with quaternizing agents or dialkyl carbonates (as mentioned above) described in U.S. Pat. No. 4,271,217].

As other coatability improver (B6), there may be mentioned (ax1) and (ax2) mentioned above, chlorinated products thereof [(those prepared by substituting hydrogen in the molecule of (ax1) or (ax2) with chlorine)], and the like. In view of exerting the resin modification effect of the coatability improver (II) according to the invention better, it is preferred that (B6) is not contained.

As other dispersant (B7), there may be mentioned those exemplified in the above (B5) in addition to the above filler organification dispersant.

As the antioxidant (B8), there may be mentioned hindered phenol-based ones {p-t-amyl phenol/formaldehyde resin, 2,6-bis(1-methyl heptadecyl)-p-cresol, butylated cresol, styrenated cresol, 4,4'-butylidenebis(6-t-butyl-m-cresol), 4,4'-cyclohexylidenebis(2-cyclohexyl phenol), 2(2'-hydroxy-5'-methylphenyl) benzotriazole, octadecyl-3,5-di-t-butyl-4-hydroxycinnamate, butylated hydroxyanisol, propyl gallate, 2,4,5-trihydroxy butyrophenone, nordihydroguaiaretic acid (NDGA), 2,6-di-t-butyl-4-methylphenol (BHT), 2-t-butyl-4-methylphenol (BHA), 6-t-butyl-2,4,-methylphenol (24M6B), 2,6-di-t-butylphenol (26B), 2-t-butyl-4-ethylphenol, 2,6-di-t-butyl-4-ethylphenol, n-octadecyl-3-(4'-hydroxy-3,5-di-t-butylphenyl) propionate, 4,4'-butylidenebis (6-t-butyl-3-methylphenol), 4,4'-methylenebis(6-t-butylphenol), 4,4'-bis(2,6-di-t-butylphenol), 2,2'-methylene bis(4-methyl-6-t-butylphenol), 2,2'-thiobis(6-t-butyl-4-hydroxy-2-methylphenol, 1,6-bis(3,5-di-t-butyl-4-hydroxy-2-methylphenyl)butane, 1,1,3-tris(5-t-butyl-4-hydroxy-2-methylphenyl)butane), 2,4,6-tris (3,5-di-t-butyl-4-hydroxybenzyl)mesitylene, 1,3,5-tris(3,5-di-t-butyl-4-hydroxybenzyl)isocyanurate, tetrakis[β-(3,5-di-t-butyl-4-hydroxyphenyl)propionyl oxymethyl]methane, etc.};

Sulfur-containing ones [N,N'-diphenyl thiourea, dimyristylthio dipropionate, dilaurylthio dipropionate, 4,4'-thiobis (6-t-butyl-m-cresol), distearyl thiodipropionate, 6-(4-oxy-3, 5-di-t-butyl anilino)2,4-bis(n-octylthio)-1,3,5-triadine, 4,4'-thiobis(6-t-butyl-3-methylphenol), 4,4'-thiobis(6-t-butyl-o-cresol), etc.];

phosphate-containing ones [2-t-butyl-α-(3-t-butyl-4-hydroxyphenyl)-p-cumenylbis(p-nonylphenyl)phosphite, phosphite ester resin, tris(nonylphenyl)phosphite, dioctadecyl-4-hydroxy-3,5-di-t-butylbenzyl phosphonate, etc.], and the like.

As the ultraviolet absorber (B9), there may be mentioned salicylate-based ones [phenyl salicylate, 4-t-butylphenyl salicylate, p-octylphenyl salicylate, etc.]; benzophenone type ones [2,4-dihydroxybenzophenone, 2-hydroxy-4-methoxy benzophenone, 2,2'-dihydroxy-4-methoxy benzophenone, 2-hydroxy-4-methoxy-2'-carboxybenzophenone, 2-hydroxy-4-methoxy-5-sulfobenzophenone (trihydrate), 2,2'-dihydroxy-4,4'-dimethoxy benzophenone, 2-hydroxy-4-octoxybenzophenone, 2-hydroxy-4-octadecyloxy benzophenone, 4-dodecyloxy-2-hydroxybenzophenone, 5-chloro-2-hydroxybenzophenone, etc.; benzotriazole type ones [2-(2'-hydroxy-5'-methylphenyl)-benzotriazole, etc.], and the like.

The level of use of the whole amount of (B) in the composition for resin modification according to the invention is, based on the weight of said composition, generally not more than 30%, and preferably 1 to 10% in view of the effect of the modifier, the function expression of (B) and economical view point.

The level of use of each additive based on said composition is generally not more than 10%, preferably 1 to 5% for (B1); generally not more than 15%, preferably 3 to 10% for (B2); generally not more than 20%, preferably 1 to 10% for (B3); generally not more than 15%, preferably 3 to 10% for (B4); generally not more than 10%, preferably 1 to 5% for (B5); generally not more than 20%, preferably 5 to 15% for (B6); generally not more than 2%, preferably 0 to 0.5%, particularly preferably 0% for (B7); generally not more than 3%, preferably 0.01 to 1% for (B8); and generally not more than 3%, preferably 0.01 to 1% for (B9).

When the same additive is used in (B1) to (B9) mentioned above, or the additive (B) and the above filler are the same, the level of use thereof is adjusted according to the purpose regarding that each additive can also exert the effect as the other additive. Namely, each additive should not be used in the effective amount itself regardless the effect as the other additive.

As the method for producing the composition for resin modification of the invention, there may be mentioned (1) a method comprising batchwise fusion kneading of the modifier and (B), (2) a method comprising fusion kneading of a part of the modifier and (B) to produce master batch, and then adding the residual modifier to carry out fusion kneading (master batch method), and the like.

The ratio of a part of the modifier/(B) in the method (2) is preferably 5/95 to 50/50 in view of the function expression of each of the modifier and (B).

Among these methods, the method (2) (master batch method) is preferred in view of the function expression of each of the modifier and (B).

As the fusion kneading equipment, there may be mentioned as referred in the above.

In the method [1] or [2] shown as the combination method of (I) or (II) and clay, as a method for adding the modifier or composition for resin modification of the invention, or (I) or (II), clay, and optionally (B) separately in random order to the polyolefin resin (C), in the case of [1], there may be mentioned, for example, a method comprising mixing a modifier obtained in the above <1> or <2> method or a composition for resin modification optionally added with (B) with (C) using fusion kneading equipment exemplified in said <1>, optionally a powder mixer. And in the case of [2], there may be mentioned, for example, a method comprising mixing (I) or (II) and clay (optionally with a small amount of solvent such as water, etc.), and optionally (B) with (C) using fusion kneading equipment exemplified in said <1>, optionally a powder mixer.

In either the method [1] or [2] mentioned above, the finally-composed polyolefin composition can be produced via a master batch resin composition of the modifier of the invention (master batch production method of a resin composition), and such production method is preferred in view of the resin modification effect. Among said master batch resin compositions, in the case of the resin composition in which the modifier comprises a filler other than clay having a layer structure and (I) or (II), even with a small amount of addition of the modifier, excellent resin modification effect can be obtained such as improvement in the mechanical and thermal characteristics of the obtained molding mentioned below. And the resin composition in which the modifier comprises clay having a layer structure and (I) or (II) can be produced without being subjected to clay organification process prior to dispersing in resins, and also such excellent resin modification effect as mentioned above can be obtained.

The master batch resin composition of the above modifier of the invention comprises the modifier or composition for resin modification of the invention and the polyolefin resin (C). As for the ratio of the modifier based on the weight of said master batch resin composition, the lower limit is preferably 10%, more preferably 15%, particularly preferably 20% in view of the resin modification effect, and the upper limit is preferably 80%, more preferably 75%, particularly preferably 70% in view of workability.

The polyolefin resin (C) include copolymers of an ethylene polymer, for example, high-, medium- and low density polyethylene and ethylene, and a C4-30 unsaturated monomer [butene (1-butene, etc.), C5-30 α-olefins (1-hexene, 1-dodecene, etc.), vinyl acetate, (meth)acrylic acid, etc.] (copolymerization ratio 30/70 to 99/1, preferably 50/50 to 95/5), etc.; copolymers of a propylene polymer, for example, polypropylene and propylene, and C4-30 unsaturated monomer (same as the above) (copolymerization ratio is also the same as above); ethylene/propylene copolymer (copolymerization ratio 0.5/99.5 to 30/70, preferably 2/98 to 20/80); C4 or more olefin polymers, for example, polybutene, and poly-4-methylpentene-1.

(C) generally has the Mn of 10,000 to 400,000, preferably 20,000 to 300,000. Moreover, said polyolefin resin include polyolefins as polymerized and degraded polyolefins [products of mechanical, thermal or chemical degradation of high-molecular-weight polyolefins (preferably having a Mn of 50,000 to 400,000)].

In the present invention, when aiming at improving the mechanical and thermal characteristics of resins by the improvement in filler dispersibility as the modification effect of the polyolefin resin (C), as mentioned above, the finally-composed polyolefin resin contains the modifier or composition for resin modification of the invention.

On the other hand, when aiming at improving the coatability of resins (coat film adhesiveness, etc.) as the modification effect of the polyolefin resin (C), the finally-composed polyolefin resin composition contains the modifier or composition for resin modification of the invention same as mentioned above, and in addition to that, it may be a resin composition comprising the above coatability improver (II) and polyolefin resin (C) and not containing the above filler, or may also be a resin composition comprising further optionally containing one or two or more additive, except for the above filler, selected from the group consisting of a colorant, flame retardant, antistatic agent, other coatability improver, dispersant, antioxidant and ultraviolet absorber. Herein, as the additive except for the above filler, the same as those exemplified above may be mentioned.

As for the ratio of the coatability improver (II) in the above resin composition, based on the weight of said resin composition, the lower limit is preferably 0.1%, more preferably 0.5%, particularly preferably 1% in view of the resin modification effect, and the upper limit is preferably 30%, more preferably 20%, particularly preferably 15% in view of formation ability.

As mentioned hereinabove, in the present invention, the dispersant (I) comprising a modified polyolefin (A) containing a hydrophobic group comprising a polyolefin (a) having a number average molecular weight of 1,500 to 100,000 and 0.2 to 10 double bonds per 1,000 carbons at the molecular terminus and/or within the molecule, and a hydrophilic group containing at least one onium base (b), and a number average molecular weight per (b) being 750 to 50,000 can provide a method for improving the mechanical and thermal characteristics of a polyolefin plastic product by introducing this into a polyolefin. Furthermore, the coatability improver (II) comprising the above (A) of the present invention, can provide a method for improving the coatability of a polyolefin plastic product by introducing this into a polyolefin.

The following examples are further illustrative of the present invention. They are, however, by no means limitative of the scope of the invention. The property examinations were carried out by the following testing methods, and a molding test piece used was cut from a molding subjected to injection molding.

(1) Determination of Interplanar Spacing (Spacing Between Layers) d by X-ray Diffraction Pattern Evaluation For the resin composition and the molding test piece thereof (thickness: 4 mm), the reflection angle at which the reflected light intensity becomes maximum was determined using RINT 2200 powder X-ray diffraction equipment (product of Rigaku Corporation), under the conditions of X-ray wavelength of $\lambda=0.154056$ nm, tube voltage of 40.0 kV, tube current of 30 mA, divergence slit of ½°, and scattering slit of ½°. Then, the interplanar spacing d (nm) was obtained by using the following calculation formula from the multiple $2\theta$ of the obtained reflection angle. When the peak of $2\theta$ appeared at 0.1° or below, or when it could not be confirmed, d was determined to be 88 nm or more.

$$d=\lambda/(2 \sin \theta)$$

(2) Separation Between Clay Layers

The resin composition and the molding test piece (thickness: 4 mm) (both have been subjected to pigmentation treatment with rubidium oxide) were observed. The resin composition was observed directly by the naked eye, and in the case of the molding test piece, the central section was observed with a scanning electron microscope (magnification: 100,000 times). The evaluation criteria was as follows.

Excellent: seperation of clay could be confirmed easily and clay pieces are dispersed.

Good: although there was space between clay layers, layers were not completely separated.

Poor: clay was not separated and was dispersed in resin as such.

In the above criteria, the "clay piece" refers to a clay layer resulting from spread of spacing between the clay layers, "separation" refers to such condition as each of the clay layers are separated, and "dispersed in resin as such" refers to that clay is not separated and observed in the resin with such condition as forming multilayer.

(3) Impact Strength

A molding test piece (thickness: 3.2 mm) was measured by method A according to ASTM D256 (with a notch, thickness: 3.2 mm) (unit: kgf-cm/cm$^2$).

(4) Modulus in Flexure

A molding test piece (thickness: 4 mm) was measured according to ASTM D790 using a test piece (10×4×100 mm) and support spacing of 60 mm (unit: kgf/cm$^2$)

(5) Coat Film Adhesiveness Test

A molding test piece (150×70×2 mm) was sprayed with a topcoating composition prepared by diluting a commercially available melamine-alkyd type paint (Nippon Bee Chemical Co., Ltd.'s "Flexen #101") with a thinner (Nippon Bee Chemical Co., Ltd.'s "#101-10") (paint/thinner weight ratio=2/1) using a sprayer. After 15 minutes of standing at room temperature, baking was carried out at 120° C. for 20 minutes using a circulating drier (dry film thickness: about 40 µm). Each coated surface obtained was subjected to adhesion testing by a cross-cut taping method according to JIS K5400.

Among 100 grids, the number of portions on which the coat film did not separate was expressed in 0 to 100.

PRODUCTION EXAMPLE 1

A four-necked flask equipped with a nitrogen inlet tube, exhaust gas distillation tube, stirring equipment and condenser was charged with 100 parts of commercially available polypropylene (pellet form) [Noblen H 501, product of Sumitomo Chemical Co., Ltd., hereinafter the same shall apply] under nitrogen atmosphere. While aerating nitrogen through the gas phase portion, the content was heated using a mantle heater, and thermally degraded at 360° C. for 70 minutes with stirring. The obtained thermally degraded product was cooled to 180° C., taken out from the flask, further cooled to room temperature, and then coarsely pulverized. The obtained thermally degraded product had 2.7 double bonds per 1,000 carbons. Another four-necked flask equipped with a nitrogen inlet tube, stirring equipment and condenser was charged with 90 parts of this thermally degraded product, 10 parts of maleic anhydride, and 100 parts of xylene. After substitution with nitrogen, the mixture was uniformly dissolved by heating to 130° C. under nitrogen aeration. Thereto was added dropwise with a solution prepared by dissolving 0.5 parts of dicumyl peroxide in 10 parts of xylene, the mixture was heated to the reflux temperature of xylene and stirred for 3 hours. Thereafter, xylene was distilled off under reduced pressure, the resultant was cooled to room temperature, and pulverized using a hammer mill to a diameter of about 2 mm to obtain a maleic anhydride-modified polyolefin (a1-1) with a Mn of 5,100 and acid value of 51.1. The thermosoftening point of (a1-1) was 145° C.

PRODUCTION EXAMPLE 2

The same procedure as in Production Example 1 was performed except that a propylene-α-olefin copolymer (pellet form) [Tafmer XR 107L, product of Mitsui Chemicals Inc.] was used as a high-molecular-weight polyolefin resin to obtain maleic anhydride-modified polyolefin with a Mn of 5,040 and acid value of 50.8 (a1-2) (powdery form). The thermosoftening point of (a1-2) was 113° C. Additionally, the thermally degraded product obtained in the production process had 2.8 double bonds per 1,000 carbons.

EXAMPLE 1

A four-necked flask equipped with a nitrogen inlet tube, exhaust gas distillation tube, stirring equipment and condenser was charged with 850 parts of (a1-1) and 850 parts of xylene. While aerating nitrogen through the gas phase portion, the content was heated to 140° C. using a mantle heater to be homogenized, and subjected to reaction for 2 hours by adding 100 parts of N,N-dimethyl-1,3-propanediamine for 10 minutes. After cooling the mixture to 100° C., 59 parts of diethyl sulfate was added over 10 minutes and the reaction was continued for 1 hour. Then, 500 parts of xylene was distilled off at 170° C. under reduced pressure, and the resultant was cooled to 130° C. and taken out on a tray on which a release paper was spread. Using a reduced-pressure dryer at 150° C., the residual xylene was distilled off, and the resultant was cooled and pulverized to obtain 1,000 parts of a modified polyolefin (A1) (powdery form).

EXAMPLE 2

The same procedure as in Example 1 was performed except that (a1-2) was used in lieu of (a1-1) to obtain a modified polyolefin (A2) (powdery form).

EXAMPLE 3

The same procedure as in Example 1 was performed except that 128 parts of N,N-diethyl-1,3-propanediamine was used in lieu of 100 parts of N,N-dimethyl-1,3-propanediamine to obtain a modified polyolefin (A3) (powdery form).

EXAMPLE 4

The same procedure as in Example 1 was performed except that 184 parts of N,N-di-n-butyl-1,3-propanediamine was used in lieu of 100 parts of N,N-dimethyl-1,3-propanediamine to obtain a modified polyolefin (A4) (powdery form).

EXAMPLE 5

The same procedure as in Example 1 was performed except that 47 parts of dimethyl sulfate was used in lieu of 59 parts of diethyl sulfate to obtain a modified polyolefin (A5) (powdery form).

COMPARATIVE EXAMPLE 1

A four-necked flask equipped with a nitrogen inlet tube, exhaust gas distillation tube, stirring equipment and condenser was charged with 850 parts of (a1-1) and 850 parts of xylene. While aerating nitrogen through the gas phase portion, the content was heated to 140° C. using a mantle heater to be homogenized, and subjected to reaction for 2 hours by adding 73 parts of monoethanolamine for 10 minutes. Thereafter, xylene was distilled off at 170° C. under reduced pressure, and the resultant was cooled and pulverized to obtain a hydroxyl-modified polyolefin (Comparative A1) (powdery form).

EXAMPLE 6 TO 10, COMPARATIVE EXAMPLE 2

100 parts of commercially available polypropylene, each 10 parts of (A1) to (AS) and (Comparative A1) were respectively blended for 3 minutes using the Henschel mixer. Then, the mixture was subjected to fusion kneading using a two-screw extruder with a vent at 240° C., 100 rpm and holding time of 20 minutes to obtain a polyolefin resin composition. Predetermined test pieces were produced using the composition with an injection molding machine, and the coat film adhesiveness was evaluated. The results are shown in Table 1.

TABLE 1

|  | Example | | | | | Compar. |
| --- | --- | --- | --- | --- | --- | --- |
|  | 6 | 7 | 8 | 9 | 10 | Ex. 2 |
| Coat film adhesiveness | 100/100 | 100/100 | 100/100 | 100/100 | 100/100 | 94/100 |

PRODUCTION EXAMPLE 3

To 2,000 parts of slurry prepared by dispersing 20 parts of clay [Kunipia F, montmorillonite produced by Kunimine Industries, Co., Ltd, hereinafter the same shall apply] in water (deionized water, hereinafter the same shall apply), 1,500 parts of aqueous solution at 80° C. prepared by dissolving 21 parts of distearyl dimethylammonium chloride in water was mixed at once with stirring. After stirring the mixture for 30 minutes, the precipitate was filtered and washed twice with 200 parts of water at 80° C. Then, the precipitate was spread on a release paper and dried for 60 minutes using a circulating drier at 130° C. to obtain organized clay (L1) having an interplanar spacing (spacing between layers) d of 28 nm.

EXAMPLES 11 TO 18, COMPARATIVE EXAMPLES 3 TO 5

100 parts of commercially available polypropylene, modified polyolefin and a filler were blended for 3 minutes according to the mixing amount (part) shown in Table 2 using the Henschel mixer. Then, the mixture was subjected to fusion kneading using a two-screw extruder with a vent at 240° C., 100 rpm and holding time of 20 minutes to obtain a polyolefin resin composition. Predetermined test pieces where produced using the composition with an injection molding machine. The resin property evaluation and evaluation by X-ray diffraction equipment were carried out. The results are shown in Table 2.

TABLE 2

|  |  |  | Example | | | | | | | | Compar. Ex. | | |
| --- | --- | --- | --- | --- | --- | --- | --- | --- | --- | --- | --- | --- | --- |
|  |  |  | 11 | 12 | 13 | 14 | 15 | 16 | 17 | 18 | 3 | 4 | 5 |
| Mixing ratio (part) | | PP*1 | 75 | 75 | 75 | 75 | 75 | 90 | 90 | 90 | 75 | 90 | 90 |
| | Modified polyolefin | A1 | 5 | | | | | 5 | | 5 | | | |
| | | A2 | | 5 | | | | | | | | | |
| | | A3 | | | 5 | | | | | | | | |
| | | A4 | | | | 5 | | | 5 | | | | |
| | | A5 | | | | | 5 | | | | | | |
| | | a1-1 | | | | | | | | | 5 | | 5 |
| | | a1-2 | | | | | | | | | | 5 | |
| | Filler | CC*2 | 20 | 20 | 20 | 20 | 20 | | | | 20 | | |
| | | Clay*3 | | | | | | 5 | 5 | | | 5 | |
| | | L1 | | | | | | | | 5 | | | 5 |
| Evaluation | Molding | Interplanar spacing d | | | | | | 88 or more | 88 or more | 88 or more | | 2.4 | 30 |
| | | Separation between clay layers | | | | | | Excellent | Excellent | Excellent | | Poor | Good |

TABLE 2-continued

| | | Example | | | | | | | Compar. Ex. | | |
|---|---|---|---|---|---|---|---|---|---|---|---|
| | | 11 | 12 | 13 | 14 | 15 | 16 | 17 | 18 | 3 | 4 | 5 |
| Impact strength | | 40 | 45 | 39 | 42 | 40 | 42 | 45 | 32 | 18 | 23 | 25 |
| Modulus in flexure | | 31,000 | 28,000 | 30,000 | 32,000 | 31,000 | 33,000 | 34,000 | 28,000 | 22,000 | 21,000 | 23,000 |

(note)
*1PP: Polypropylene [Noblen H501, product of Sumitomo Chemical Co., Ltd.]
*2CC: Calcium carbonate [Brilliant 1500, product of SHIRAISHI KOGYO]
*3Clay: Montmorillonite [KunipiaF, product of Kunimine Industries, Co., Ltd.]

EXAMPLE 19

60 parts of the modified polyolefin (A1) and 40 parts of clay were subjected to fusion kneading using a two-screw extruder at 160° C., 100 rpm and holding time of 20 minutes. The obtained solid was cooled to room temperature, pulverized to a diameter of about 2 mm using a hammer mill to obtain a modifier for resin with d of 88 nm or more.

EXAMPLE 20

The same procedure as in Example 19 was performed except that the modified polyolefin (A4) was used in lieu of (A1), and a modifier for resin with d of 88 nm or more (K2) was obtained.

COMPARATIVE EXAMPLE 6

The same procedure as in Example 19 was performed except that the modified polyolefin (a1-1) was used in lieu of (A1), and a modifier for resin with d of 1.5 nm (Comparative K1) was obtained.

EXAMPLE 21

87.5 parts of commercially available polypropylene and 12.5 parts of (K1) was blended for 3 minutes using the Henschel mixer. Then, the mixture was subjected to fusion kneading using a two-screw extruder with a vent at 240° C., 100 rpm and holding time of 20 minutes to obtain a polyolefin resin composition. Predetermined test pieces were produced using the composition with an injection molding machine. The resin property evaluation and evaluation by X-ray diffraction equipment were carried out. The results are shown in Table 3.

EXAMPLE 22

The same procedure was performed as in Example 21 except that (K2) was used in lieu of (K1), and the evaluation was carried out. The results are shown in Table 3.

COMPARATIVE EXAMPLE 7

The same procedure was performed as in Example 21 except that (Comparative K1) was used in lieu of (K1), and the evaluation was carried out. The results are shown in Table 3.

TABLE 3

| | | | Example | | Compar. |
|---|---|---|---|---|---|
| | | | 21 | 22 | Ex. 7 |
| Mixing ratio (part) | | PP*1 | 87.5 | 87.5 | 87.5 |
| | Modifier for resin | K1 | 12.5 | | |
| | | K2 | | 12.5 | |
| | | Comparative K1 | | | 12.5 |
| Evaluation | Composition | Interplanar spacing d | 88 or more | 88 or more | 1.5 |
| | | Separation between clay layers | Excellent | Excellent | Poor |
| | Molding | Interplanar spacing d | 88 or more | 88 or more | 2.1 |
| | | Separation between clay layers | Excellent | Excellent | Poor |
| | | Impact strength | 43 | 45 | 22 |
| | | Modulus in flexure | 32,000 | 34,000 | 21,000 |

EXAMPLE 23

50 parts of commercially available polypropylene, 25 parts of clay and 25 parts of (A1) were blended for 3 minutes by the Henschel mixer, and the mixture was subjected to fusion kneading using a two-screw extruder with a vent at 200° C., 100 rpm and holding time of 20 minutes. The obtained solid was cooled to room temperature, pulverized to a diameter of about 1 mm using a hammer mill to obtain a master batch resin composition with d of 88 nm or more (M1).

EXAMPLE 24

The same procedure was performed as in Example 23 except that (A4) was used in lieu of (A1) to obtain a master batch resin composition with d of 88 nm or more (M2).

EXAMPLE 25

20 parts of (M1) and 80 parts of commercially available polypropylene were blended for 3 minutes by the Henschel mixer, and the mixture was subjected to fusion kneading using a two-screw extruder with a vent at 240° C., 100 rpm and holding time of 20 minutes. Predetermined test pieces were produced using the composition with an injection molding machine. The resin property evaluation and evaluation by X-ray diffraction equipment were carried out. The results are shown in Table 4.

EXAMPLE 26

The same procedure was performed as in Example 25 except that (M2) was used in lieu of (M1), and the evaluation was carried out. The results are shown in Table 4.

COMPARATIVE EXAMPLE 8

The same procedure as in Production Example 23 was performed except that (a1-1) was used in lieu of (A1) to obtain a master batch resin composition with d of 2.8 nm (Comparative M1).

COMPARATIVE EXAMPLE 9

The same procedure as in Production Example 25 was performed except that (Comparative M1) was used in lieu of (M1). The results are shown in Table 4.

TABLE 4

|  |  |  | Example | | Compar. |
|---|---|---|---|---|---|
|  |  |  | 25 | 26 | Ex. 9 |
| Mixing ratio (part) |  | PP*1 | 80 | 80 | 80 |
|  | Master batch resin composition | M1 | 20 |  |  |
|  |  | M2 |  | 20 |  |
|  |  | Comparative M1 |  |  | 20 |
| Evaluation | Composition | Interplanar spacing d | 88 or more | 88 or more | 2.8 |
|  |  | Separation between clay layers | Excellent | Excellent | Poor |
|  | Molding | Interplanar spacing d | 88 or more | 88 or more | 3.0 |
|  |  | Separation between clay layers | Excellent | Excellent | Poor |
|  |  | Impact strength | 45 | 47 | 23 |
|  |  | Modulus in flexure | 33,000 | 35,000 | 21,000 |

The invention claimed is:

1. A modifier for resins which comprises
a dispersant (I) or a coatability improver (II) and
a filler in combination,
said dispersant (I) or said coatability improver (II) comprising a modified polyolefin (A);
said modified polyolefin(A) containing
a hydrophobic group which is a residue of a polyolefin obtained by a carboxy modification of a polyolefin (a) having a number average molecular weight of 1,500 to 100,000 and 0.2 to 10 double bonds per 1,000 carbons at the molecular terminus or within the molecule or both, and
a hydrophilic group containing at least one onium base (b), and a number average molecular weight per (b) being 750 to 50,000.

2. The modifier according to claim 1, wherein the thermosoftening point of (a) is 30 to 210° C.

3. The modifier according to claim 1, wherein (b) is represented by the following general formula (1):

in the formula, $R^1$, $R^2$ and $R^3$ represent alkyl, alkenyl, cycloalkyl, cycloalkenyl, phenyl, aryl alkyl, or alkyl aryl group which may be substituted with a hydroxyl group and has the carbon atoms of 1 to 15; X represents alkylene, alkylidene, cycloalkylene, cycloalkylidene, arylene, aryl alkylene or alkyl arylene group containing 2 to 15 carbon atoms; Q represents N or P; and Z represents a counter anion.

4. The modifier according to claim 1, wherein the filler is clay having a layer structure.

5. The modifier according to claim 1, wherein the content of the (I) or (II) is 5 to 95% based on the weight of the modifier.

6. The modifier according to claim 1, which does not contain a filler organification dispersant other than (I).

7. The modifier according to claim 1, which does not contain a coatability improver other than (II).

8. A composition for resin modification which contains the modifier according to claim 1, and further at least one additive (B) selected from the group consisting of a colorant, reinforcing agent, flatting agent, flame retardant, antistatic agent, other coatability improver, other dispersant, antioxidant and ultraviolet absorber.

9. A master batch resin composition which comprises the modifier according to claim 1 or the composition for resin modification according to claim 8 and a polyolefin resin (C), and the content of the modifier being 10 to 80% by weight.

10. A resin composition which comprises a coatability improver (II) and a polyolefin resin (C) and contains no filler,
said coatability improver (II) comprising a modified polyolefin (A),
said modified polyolefin (A) containing
a hydrophobic group which is a residue of a polyolefin obtained by a carboxy modification of a polyolefin (a) having a number average molecular weight of 1,500 to 100,000 and 0.2 to 10 double bonds per 1,000 carbons at the molecular terminus or within the molecule or both, and
a hydrophilic group containing at least one onium base (b), and a number average molecular weight per (b) being 750 to 50,000.

11. The resin composition according to claim 10, which further contains at least one additive, other than a filler, selected from the group consisting of a colorant, flame retardant, antistatic agent, other coatability improver, dispersant, antioxidant and ultraviolet absorber.

12. A method for improving mechanical and thermal characteristics of a polyolefin plastic product which comprises introducing a dispersant (I) comprising
a modified polyolefin (A) containing
a hydrophobic group which is a residue of a polyolefin obtained by a carboxy modification of a polyolefin (a) having a number average molecular weight of 1,500 to 100,000 and 0.2 to 10 double bonds per 1,000 carbons at the molecular terminus or within the molecule or both, and
a hydrophilic group containing at least one onium base (b), and a number average molecular weight per (b) being 750 to 50,000.

13. A method for improving the coatability of a polyolefin plastic product which comprises introducing a coatability improver (II) comprising a modified polyolefin (A) containing

- a hydrophobic group which is a residue of a polyolefin obtained by a carboxy modification of a polyolefin (a) having a number average molecular weight of 1,500 to 100,000 and 0.2 to 10 double bonds per 1,000 carbons either at the molecular terminus or within the molecule or both, and
- a hydrophilic group containing at least one onium base (b), and a number average molecular weight per (b) being 750 to 50,000, into a polyolefin resin.

* * * * *